United States Patent
Hamada et al.

(10) Patent No.: US 8,898,336 B2
(45) Date of Patent: Nov. 25, 2014

(54) CONTENT CONVERSION SYSTEM AND CONTENT CONVERSION SERVER

(75) Inventors: Kei Hamada, Fukuoka (JP); Kenichi Abiru, Kawasaki (JP); Kouichirou Amemiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 338 days.

(21) Appl. No.: 13/095,675

(22) Filed: Apr. 27, 2011

(65) Prior Publication Data

US 2012/0011281 A1 Jan. 12, 2012

(30) Foreign Application Priority Data

Jul. 7, 2010 (JP) ................................. 2010-154972

(51) Int. Cl.
- *G06F 15/16* (2006.01)
- *H04L 29/06* (2006.01)
- *H04L 29/08* (2006.01)
- *H04L 29/12* (2006.01)

(52) U.S. Cl.
CPC .......... *H04L 67/2842* (2013.01); *H04L 69/163* (2013.01); *H04L 61/2517* (2013.01); *H04L 61/2528* (2013.01); *H04L 67/288* (2013.01)
USPC ............................. 709/246; 709/202; 709/203

(58) Field of Classification Search
CPC ............ H04L 67/2842; H04L 67/2823; G06F 17/30905
USPC ......................................... 709/246, 202, 203
See application file for complete search history.

(56) References Cited

U.S. PATENT DOCUMENTS

| | | | |
|---|---|---|---|
| 7,120,829 B2 | 10/2006 | Shigeta | |
| 2001/0013088 A1* | 8/2001 | Matsumoto | 711/135 |
| 2004/0010562 A1* | 1/2004 | Itonaga | 709/213 |
| 2007/0050491 A1* | 3/2007 | Kataoka et al. | 709/223 |
| 2007/0124769 A1* | 5/2007 | Casey et al. | 725/46 |
| 2010/0017502 A1* | 1/2010 | Cheng et al. | 709/219 |

FOREIGN PATENT DOCUMENTS

| | | |
|---|---|---|
| JP | 2001-117809 A | 4/2001 |
| JP | 2002-176451 | 6/2002 |
| JP | 2003-028935 | 1/2003 |

OTHER PUBLICATIONS

Office Action of Japan Patent Application 2010-154972 mailed Mar. 4, 2014, with English translation, 7 pages.

* cited by examiner

*Primary Examiner* — Nicholas Taylor
(74) *Attorney, Agent, or Firm* — Fujitsu Patent Center

(57) ABSTRACT

A conversion server stores therein a combination of client information indicating the type of a client terminal and content information that is requested to be sent from the client terminal. Furthermore, the conversion server stores therein server information indicating a conversion server responsible for the format of content in such a manner that the server information is associated with the combination of the client information and the content information. If the conversion server receives, from the client terminal, a send request for content, the conversion server distinguishes between the client information on the client terminal and the content information on the content requested to be sent. The conversion server notifies a conversion server indicated by the server information associated with the combination of the distinguished client information and the distinguished content information of the distinguished client information and the distinguished content information.

7 Claims, 29 Drawing Sheets

| CLIENT END | | SERVER END | | | |
|---|---|---|---|---|---|
| | | BEFORE CONVERSION | | AFTER CONVERSION | |
| IP ADDRESS | PORT NUMBER | IP ADDRESS | PORT NUMBER | IP ADDRESS | PORT NUMBER |
| 192.0.2.254 | 10000 | 192.0.2.1 | 80 | 10.10.10.22 | 80 |
| 192.0.2.253 | 20000 | 192.0.2.1 | 80 | 10.10.10.23 | 80 |
| 192.0.2.252 | 22222 | 192.0.2.1 | 80 | 10.10.10.24 | 80 |

| DESTINATION SERVER | IP ADDRESS | PORT NUMBER |
|---|---|---|
| #1 | 10.10.10.22 | 80 |
| #2 | 10.10.10.23 | 80 |
| ⋮ | ⋮ | ⋮ |
| #n | 10.10.10.24 | 80 |

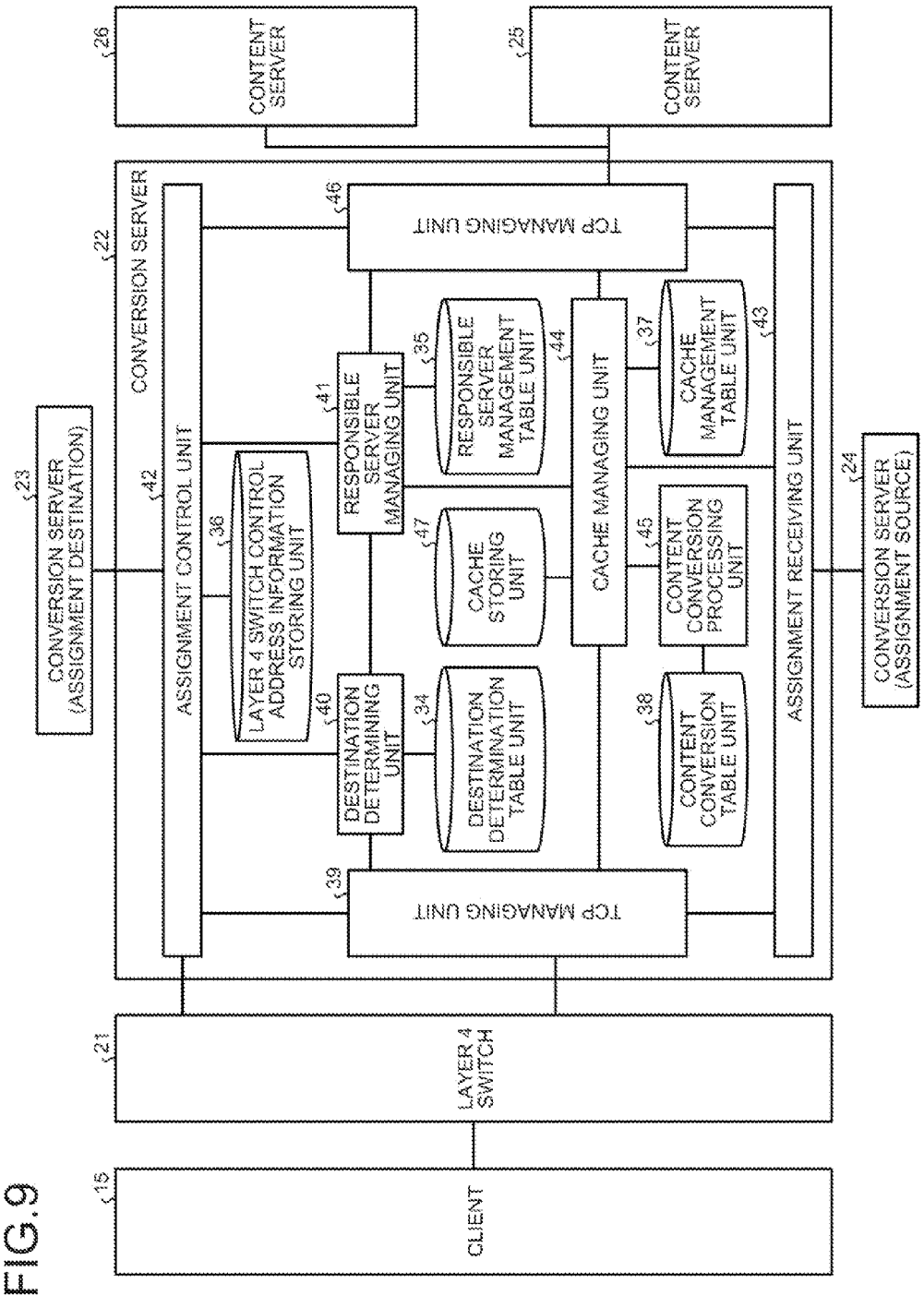

FIG.10

| REQUEST-URI | CONTENT SERVER | |
|---|---|---|
| | IP ADDRESS | PORT NUMBER |
| /contents/A1 | 10.10.100.25 | 80 |
| /contents/A1 | 10.10.100.26 | 80 |
| /contents/A1 | 10.10.100.27 | 80 |
| /contents/A1 | 10.10.100.25 | 80 |
| /contents/B2 | 10.10.100.25 | 80 |
| /contents/B2 | 10.10.100.26 | 80 |
| /contents/B2 | 10.10.100.27 | 80 |

FIG.11

| REQUEST-URI | USER-AGENT | CACHE ID | RESPONSIBLE SERVER | | |
|---|---|---|---|---|---|
| | | | IP ADDRESS | RECEIVING PORT NUMBER | CONTROL PORT NUMBER |
| /contents/A1 | XXX/1.0/xxx/ | 1 | 10.10.10.23 | 80 | 1111 |
| /contents/A1 | XXX/1.0/aaa/ | 2 | 10.10.10.23 | 80 | 1111 |
| /contents/A1 | XXX/1.0/bbb/ | 3 | 10.10.10.23 | 80 | 1111 |
| /contents/A1 | YYY/1.0/yyy/ | 4 | 10.10.10.23 | 80 | 1111 |
| /contents/B2 | XXX/1.0/xxx/ | 5 | 10.10.10.22 | 80 | 1111 |
| /contents/B2 | XXX/1.0/aaa/ | 6 | 10.10.10.22 | 80 | 1111 |
| /contents/B2 | XXX/1.0/bbb/ | 7 | 10.10.10.22 | 80 | 1111 |
| /contents/B2 | YYY/1.0/yyy/ | 8 | 10.10.10.22 | 80 | 1111 |

FIG.12

| LAYER 4 SWITCH CONTROL ADDRESS INFORMATION | |
|---|---|
| IP ADDRESS | PORT NUMBER |
| 10.10.10.254 | 1111 |

FIG.13

| CACHE ID | EXISTENCE/ NONEXISTENCE | CACHE STORAGE AREA |
|---|---|---|
| 1 | 1 | /cache/1 |
| 2 | 1 | /cache/2 |
| 3 | 0 | /cache/3 |
| 4 | 1 | /cache/4 |

FIG.14

| CACHE ID | BEFORE-CONVERSION CONTENT | CONVERTED CONTENT |
|---|---|---|
| 1 | HTML | CHTML |
| 2 | HTML | CHTML |
| 3 | XML | CHTML |
| 4 | XML | HTML |

FIG.15

| IP HEADER |
|---|
| TCP HEADER |
| HTTP/1.1 /contents/A1¥r¥n<br>Cookie:<br>JSESSIONID=55D95DFFF39788A6729C2F74018AA23C;¥r¥n<br>Content-Type: text/html;charset=ISO-8859-1¥r¥n<br>Date: Tue, 29 Jan 2008 12:38:25 GMT¥r¥n<br>User-Agent: XXX/1.0/xxx/12345¥r¥n<br>Connection: Keep-Alive¥r¥n |

LAYER 7 PROTOCOL HEADER EXAMPLE: HTTP HEADER

CONTENT CONVERSION SYSTEM AND CONTENT CONVERSION SERVER

CROSS-REFERENCE TO RELATED APPLICATIONS

This application is based upon and claims the benefit of priority of the prior Japanese Patent Application No. 2010-154972, filed on Jul. 7, 2010, the entire contents of which are incorporated herein by reference.

FIELD

The embodiments discussed herein are directed to a content conversion program, a content conversion system, and a content conversion server.

BACKGROUND

In recent years, various types of terminals have been used, and the number of types of such terminals is tending to increase. Furthermore, data formats that can be used by such terminals vary in each terminal type. Accordingly, a content conversion system is known, in which, if delivery of data (for example, content) is requested from a terminal, the format of the content is converted in accordance with the type of terminal that requests the delivery of the content.

Such a content conversion system includes conversion servers that convert the format of content to the format that can be used by client terminals. Such conversion servers convert, for example, contents in the Hyper Text Markup Language (HTML) format stored in a content server to contents in the Compact HTML (cHTML) format that can be used by mobile terminals.

Furthermore, when converting the format of content, the conversion servers store converted content in cache memories (hereinafter, referred to as a "cache") in order to efficiently perform processes. Then, if a conversion server receives a request for the same content from the same type of terminal, the conversion server efficiently performs a process by sending, to the client terminal, the converted content stored in the cache.

In the following, a specific example of a process performed by a conversion server will be described with reference to FIG. 36. For example, the conversion server receives a request for a content "C#2" from a client terminal whose terminal type is "CL_A" (see (1) of FIG. 36). Then, the conversion server determines whether content that has been converted from the format of the content "C#2" to the format that can be used by the terminal whose terminal type is "CL_A" is stored in a cache in the conversion server.

If as a result of the determination the conversion server determines that the converted content is not stored in the cache in the conversion server, the conversion server sends the request for the content "C#2" to a content server #2 (see (2) of FIG. 36). Furthermore, the conversion server acquires the content "C#2" that is sent from the content server #2 (see (3) of FIG. 36). Then, the conversion server converts the format of the acquired content "C#2" to the format that can be used by the terminal whose terminal type is "CL_A" and sends the converted content to the client terminal (see (4) of FIG. 36).

Furthermore, the conversion server stores the converted content in the cache. If the conversion server again receives a request for the content "C#2" from the client terminal whose terminal type is "CL_A", the conversion server sends, to the client, the converted content stored in the cache. In other words, the conversion server sends the converted content to the client without performing a conversion process on the content "C#2".

To enhance the content conversion system's overall performance, the content conversion system having such a conversion server is known that uses a scale-out architecture in which send requests received from clients are distributed to conversion servers.

For example, in the example illustrated in FIG. 37, a content conversion system includes a layer 4 switch, conversion servers #1 to #3, and content servers #1 to #3. With the content conversion system, the layer 4 switch distributes requests received from each client to the conversion servers #1 to #3 and allows each of the conversion servers #1 to #3 to perform a process, thus enhancing the performance of the overall system.

For example, in the example illustrated in FIG. 37, if the layer 4 switch receives a request for the content "C#2" from the client terminal whose terminal type is "CL_A", the layer 4 switch randomly selects a destination conversion server from among the conversion servers #1 to #3. Then, the layer 4 switch distributes, to the randomly selected conversion server #1, the request received from the client terminal whose terminal type is "CL_A".

However, with the content conversion system having the scale-out architecture described above, because requests from each client are randomly distributed to each conversion server, there is a problem in that the cache stored in each conversion server cannot be appropriately used.

For example, with the content conversion system, if a request is received from a client terminal, in some cases, the request from the client terminal may be distributed to the conversion server #1 even when the cache corresponding to the conversion result is stored in the conversion server #2. In such a case, because the content conversion system cannot use the cache stored in the conversion server #2, the cache hit rate decreases, which means the cache cannot be appropriately used.

Furthermore, it is conceivable that the cache hit rate can be improved by synchronizing each cache in each conversion server arranged in the content conversion system; however, processing loads for synchronizing the caches increase in accordance with the number of conversion servers. For example, in the example in FIG. 38, to synchronize the caches, the conversion server #1 sends the converted content to the other conversion servers #2 and #3 and allows the conversion servers #2 and #3 to store the converted content every time the format of the content is converted. Accordingly, for the content conversion system, processing loads for sending the converted content increase in accordance with the number of conversion servers.

Patent Document: Japanese Laid-open Patent Publication No. 2003-28935

SUMMARY

According to an aspect of an embodiment of the invention, a content conversion system includes a first conversion server and a second conversion server. The first conversion server includes a storing unit that stores therein, in an associated manner, a combination of client information indicating a type of a client terminal and content information indicating content that is data requested to be sent from the client terminal and server information indicating a conversion server responsible for converting a format of the content to a format that can be used by the client terminal whose type is indicated by the client information; a distinguishing unit that analyzes, when a send request for content is received from a given client terminal, the send request and that distinguishes between the client information indicating a type of the given client terminal and the content information indicating the content to be sent; an acquiring unit that acquires, from the storing unit, the server information that is associated with the combination of the client information and the content information that are distinguished by the distinguishing unit; and a notifying unit that notifies the conversion server that is indicated by the server information acquired by the acquiring unit of the distinguished client information and the distinguished content information. The second conversion server includes a determining unit that determines, when the second conversion server is notified by the first conversion server of the client information and the content information that indicates the content, whether a converted content in which a format of the content indicated by the content information notified by the first conversion server is converted to a format that can be used by the client terminal whose type is indicated by the client information notified by the first conversion server is stored in a cache in the second conversion server; and a sending unit that sends, when it is determined, by the determining unit, that the converted content is stored in the cache in the second conversion server, to the client terminal, the converted content that is stored in the cache in the second conversion server.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 9 is a schematic diagram illustrating a conversion server according to the second embodiment;

FIG. 10 is a schematic diagram illustrating an example of information stored in a destination determination table unit;

FIG. 11 is a schematic diagram illustrating an example of a responsible server management table;

FIG. 12 is a schematic diagram illustrating an example of layer 4 switch control address information;

FIG. 13 is a schematic diagram illustrating an example of a cache management table;

FIG. 14 is a schematic diagram illustrating an example of a content conversion table;

FIG. 15 is a schematic diagram illustrating an example of a request message;

DESCRIPTION OF EMBODIMENTS

Preferred embodiments of the present invention will be explained with reference to accompanying drawings.

[a] First Embodiment

Figure 1:
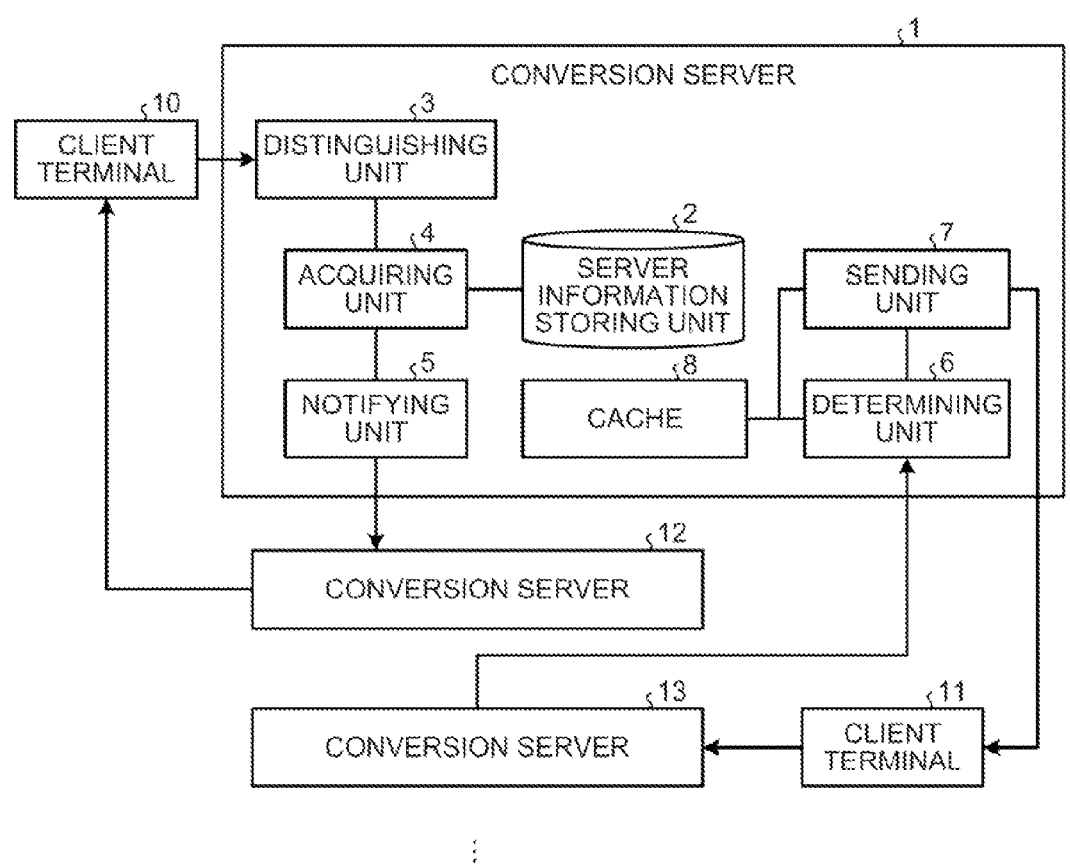
FIG. 1 is a schematic diagram illustrating a conversion server according to a first embodiment.

In a first embodiment, an example of a conversion server will be described with reference to FIG. 1. FIG. 1 is a schematic diagram illustrating the conversion server according to the first embodiment.

As illustrated in FIG. 1, a conversion server 1 includes a server information storing unit 2, a distinguishing unit 3, an acquiring unit 4, a notifying unit 5, a determining unit 6, a sending unit 7, and a cache 8. Conversion servers 12 and 13 have the same configuration as that of the conversion server 1.

The server information storing unit 2 stores therein, in an associated manner, server information uniquely indicating a conversion server and a combination of client information indicating the type of client terminal and content information indicating content. The cache 8 is a cache memory that stores therein a content whose format is converted to the format that can be used by a client terminal.

If the distinguishing unit 3 receives a send request for the content from a client terminal 10, the distinguishing unit 3 analyzes the received send request and distinguishes between client information indicating the type of the client terminal 10 that sends the send request and content information indicating the content that is requested to be sent.

The acquiring unit 4 acquires, from the server information storing unit 2, server information associated with a combination of the client information and the content information distinguished by the distinguishing unit 3. The notifying unit 5 notifies the conversion server 12 that is indicated by the server information acquired by the acquiring unit 4 of both the client information and the content information acquired by the acquiring unit 4.

The determining unit 6 determines whether a converted content, whose format indicating the content information notified by the other conversion server 13 is converted to the format that can be used by the client terminal of the type that is indicated by the notified client information, is stored in the cache 8 in the conversion server 1.

If the determining unit 6 determines that a converted content is stored in the cache 8 in the conversion server 1, the sending unit 7 sends the converted content stored in the cache 8 in the conversion server 1 to a client terminal 11.

For example, in the example illustrated in FIG. 1, server information indicating the conversion server 12 is associated, in advance, with a combination of the terminal type "CL_A" and the content "C#2" and then stored. If the conversion server 1 receives a send request for the content "C#2" from the client terminal 10 whose terminal type is "CL_A", the conversion server 1 identifies the conversion server 12 responsible for converting the format of the content "C#2" to the format that can be used by the client terminal whose terminal type is "CL_A". Then, the conversion server 1 sends both the terminal type "CL_A" and the content "C#2" to the conversion server 12 and assigns a conversion process.

Then, the conversion server 12 determines whether the converted content whose format has been converted from the format of the content "C#2" to the format that can be used by the client terminal with terminal type "CL_A" is stored in the cache 8. If the converted content is stored in the cache 8, the conversion server 12 sends the converted content stored in the cache 8 to the client terminal 10.

Specifically, a combination of the content "C#2" and the terminal type "CL_A" is associated in advance with the server information that indicates the conversion server 12 and then is stored. Then, if the conversion server 1 receives a send request for the content "C#2" from the client terminal 10 whose terminal type is "CL_A", the conversion server 1 always assign the process to the conversion server 12. In this way, because a conversion server responsible for a combination of the content and the client terminal type is fixed, if an appropriate cache exists in the system, a cache hit always occurs. Accordingly, each of the conversion servers 1, 12, and 13 does not need to synchronize the cache in each conversion server, guarantees a cache hit, and exhibits a processing performance that is proportional to the number of conversion servers.

As described above, each of the conversion servers 1, 12, and 13 stores therein, in an associated manner in advance, a combination of content whose format is converted and the client terminal type and server information. Then, if the conversion server 1 receives a send request, the conversion server 1 assigns the process to a conversion server associated with a combination of the client terminal type corresponding to the source of the received send request and content requested to be sent. Accordingly, if the cache 8 related to the received send request is stored in the other conversion server 12 or 13, the conversion server 1 can assign the process to the conversion server that holds the cache. As a result, each of the conversion servers 1, 12, and 13 can appropriately use the cache stored in each conversion server without increasing the conversion servers' processing loads.

[b] Second Embodiment

In a second embodiment, a content conversion system having a plurality of conversion servers that delivers content in accordance with requests from clients.

Content Conversion System

Figure 2:
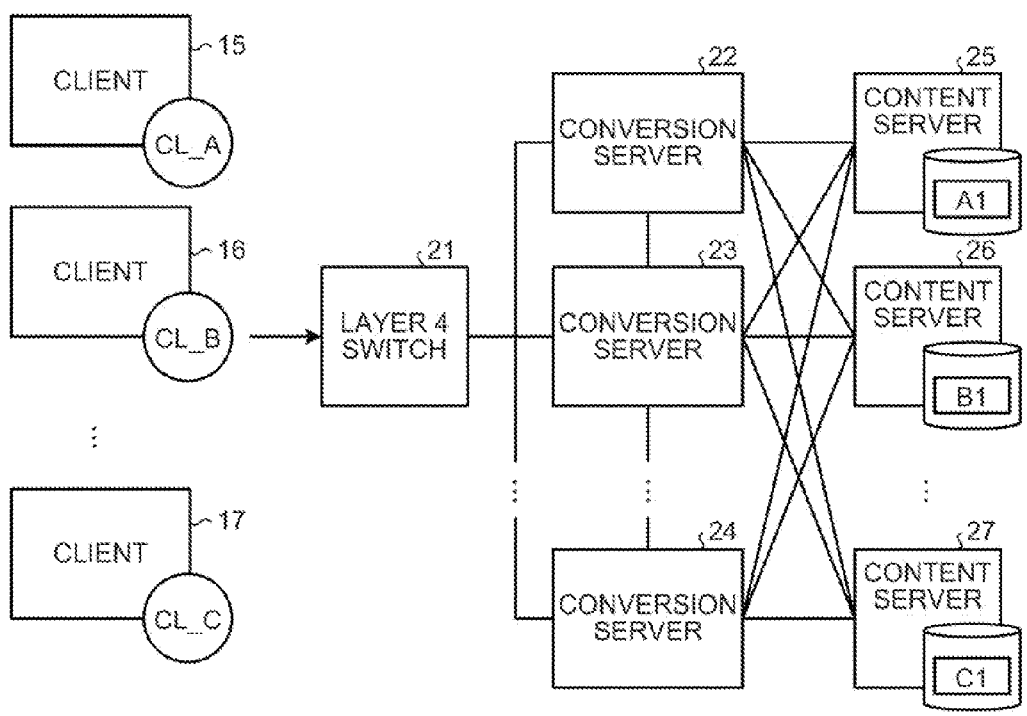
FIG. 2 is a schematic diagram illustrating a content conversion system according to a second embodiment.

First, the configuration of the content conversion system will be described with reference to FIG. 2. FIG. 2 is a schematic diagram illustrating a content conversion system according to a second embodiment. In the example illustrated in FIG. 2, the content conversion system includes a layer 4 switch 21, a plurality of conversion servers 22 to 24, and a plurality of content servers 25 to 27.

Clients 15 to 17 are terminals that request content stored in each of the content servers 25 to 27 via the layer 4 switch 21 and the conversion servers. For example, in the example illustrated in FIG. 2, the client 15 is a terminal whose terminal type is "CL_A", the client 16 is a terminal whose terminal type is "CL_B", and the client 17 is a terminal whose terminal type is "CL_C". Furthermore, the clients 15 to 17 send, to the layer 4 switch 21, a request message that is a send request for content stored in the content servers 25 to 27.

The content servers 25 to 27 are servers that store therein content. For example, in the example illustrated in FIG. 2, the content server 25 stores therein the content "A1", the content server 26 stores therein the content "B1", and the content server 27 stores therein the content "C1".

The layer 4 switch 21 is a switch that distributes a request message sent from any one of the clients 15 to 17 to any of the conversion servers 22 to 24. Specifically, if the layer 4 switch 21 receives a request message sent from any one of the clients 15 to 17, the layer 4 switch 21 randomly selects a conversion server that corresponds to the destination of the request message. Then, the layer 4 switch 21 sends the request message received from the client to the selected conversion server.

The conversion server 22 is a conversion server that converts the format of content to the format that can be used by the client. Specifically, the conversion server 22 stores therein, in an associated manner in advance, a combination of information indicating content and information indicating the terminal type and information indicating a conversion server. For example, the conversion server 22 associates, in advance, a combination of the content "B1" and the terminal type "CL_A" of the client 15 with an IP address of the conversion server 22 and then stores them therein. Furthermore, the conversion server 22 converts the format of the content "B1" to the format that can be used by the client 15 whose terminal type is "CL_A".

In the following, a process performed by the conversion server will be described. For example, in the example illustrated in FIG. 2, if the conversion server 23 receives a request message for sending the content "B1" from the client 15, the conversion server 23 analyzes the request message. Then, the conversion server 23 distinguishes between client information "CL_A" indicating the terminal type of the client 15 and content information "B1" indicating the content that is requested to be sent. Furthermore, the conversion server 23 specifies the conversion server 22 associated with the combination of the client information "CL_A" and the content information "B1". The conversion server 23 assigns, to the specified conversion server 22, a process for converting the content indicated by the content information "B1" to the format that can be used by the client 15 and a process for sending the converted content to the client 15.

Furthermore, if the conversion server 22 is assigned to perform each process by the conversion server 23, the conversion server 22 determines whether the converted content is stored in the cache. If the conversion server 22 determines that the converted content is stored in the cache, the conversion server 22 sends the converted content stored in the cache to the client 15.

If the conversion server 22 determines that the converted content is not stored in the cache, the conversion server 22 acquires the content "B1" from the content server 26. Then, the conversion server 22 converts the acquired content "B1" to the format that can be used by the client 15, whose terminal type is "CL_A", and sends the converted content to the client 15. Furthermore, the conversion server 22 stores the converted content in the cache.

Specifically, if each of the conversion servers 22 to 24 receives a request message from a client, each of the conversion servers 22 to 24 assigns a process to a conversion server that is associated with a combination of the type of the client corresponding to the source of the request message and the requested content to be sent. For example, if each of the conversion servers 22 to 24 receives a request message that requests the sending of the content "B1" from the client 15 whose terminal type is "CL_A", the processes are assigned only to the conversion server 22.

Accordingly, if each of the conversion servers 22 to 24 again receives a send request for the content "B1" from a client whose terminal type is "CL_A", each of the conversion servers 22 to 24 can use the converted content stored in the conversion server 22. In other words, if an appropriate cache exists in any one of the conversion servers 22 to 24, each of the conversion servers 22 to 24 can guarantee a cache hit.

As described above, because each of the conversion servers 22 to 24 assigns the process to the conversion server associated with a combination of the client type and the requested content to be sent, the conversion servers 22 to 24 guarantee a cache hit without synchronizing each cache in each conversion server. As a result, while guaranteeing a cache hit, the conversion servers 22 to 24 do not need to synchronize the cache across each conversion servers and thus exhibit a processing performance that is proportional to the number of conversion servers.

In the following, components included in the content conversion system will be described with reference to the drawings. First, a process performed by the layer 4 switch 21 will be described. Then, each component included in the layer 4 switch 21 will be described. Subsequently, each component included in the conversion servers 22 to 24 will be described in detail. Finally, examples of processes performed by each component included in the conversion server will be described.

Figure 3:
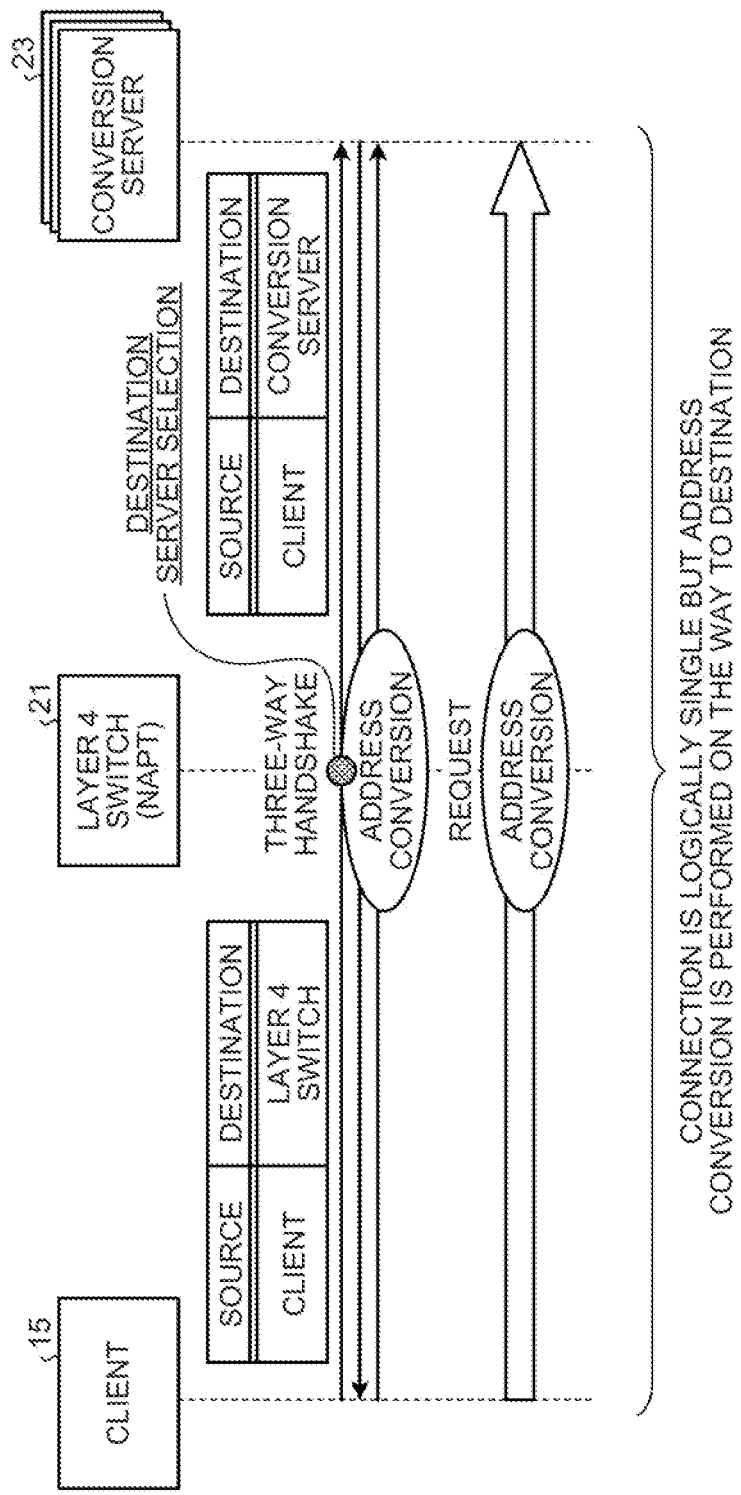
FIG. 3 is a schematic diagram illustrating a layer 4 switch.

First, a process performed by the layer 4 switch 21 will be described with reference to FIG. 3. FIG. 3 is a schematic diagram illustrating a layer 4 switch. In the example illustrated in FIG. 3, the layer 4 switch 21 connects, using a network address port translation (NAPT), the client 15 to the conversion server 23.

For example, if the layer 4 switch 21 receives, from the client 15, a three-way-handshake SYN packet with respect to the layer 4 switch 21, the layer 4 switch 21 selects the conversion server 23 as the destination conversion server. Then, the layer 4 switch 21 converts the IP address of the layer 4 switch 21 contained in the SYN packet as the destination to the IP address of the selected conversion server 23. Thereafter, the layer 4 switch 21 sends the SYN packet to the conversion server 23.

Furthermore, if the layer 4 switch 21 receives an ACK packet from the conversion server 23 to which the SYN packet has been sent, the layer 4 switch 21 converts the source of the received ACK packet to the IP address of the layer 4 switch 21 and sends the ACK packet to the client 15. Then, the layer 4 switch 21 converts the destination of the ACK packet sent from the client 15 to the IP address of the conversion server 23 and sends the ACK packet to the conversion server 23.

Thereafter, the layer 4 switch 21 converts the destination of a request sent from the client 15 to an IP address of the conversion server 23 and sends the request to the conversion server 23. In other words, the layer 4 switch 21 converts addresses while logically and uniquely maintaining the connection between the client 15 and the selected conversion server 23.

Figures 4, 5:
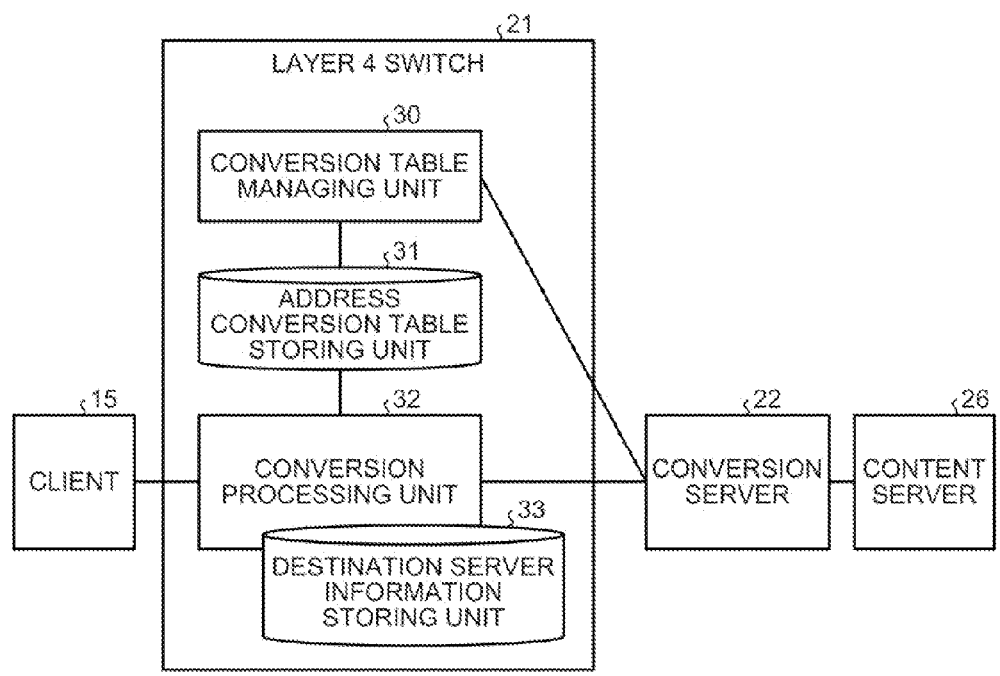
FIG. 4 is a schematic diagram illustrating the layer 4 switch according to the second embodiment.
FIG. 5 is a schematic diagram illustrating an example of an address conversion table.

In the following, each component included in the layer 4 switch 21 will be described with reference to FIG. 4. FIG. 4 is a schematic diagram illustrating the layer 4 switch according to the second embodiment. In the example illustrated in FIG. 4, the layer 4 switch 21 includes a conversion table managing unit 30, an address conversion table storing unit 31, a conversion processing unit 32, and a destination server information storing unit 33.

In the following description, it is assumed that the layer 4 switch 21 logically connects the client 15 to the conversion server 22 using a single connection. Furthermore, it is assumed that the client 15 sends a request for content stored in the content server 26.

The address conversion table storing unit 31 stores therein an address conversion table. The address conversion table mentioned here is a table for storing, in an associated manner, a client IP address, a client port number, a server-end before-conversion IP address, a server-end before-conversion port number, a server-end converted IP address, and a server-end converted port number.

For example, in the example illustrated in FIG. 5, a client IP address "192.0.2.254", a client port number "10000", and a server-end before-conversion IP address "192.0.2.1" are stored in the address conversion table in an associated manner. Furthermore, a server-end before-conversion port number "80", a server-end converted IP address "10.10.10.22", and a server-end converted port number "80" are stored in the address conversion table in an associated manner. FIG. 5 is a schematic diagram illustrating an example of the address conversion table.

Figures 6, 7:
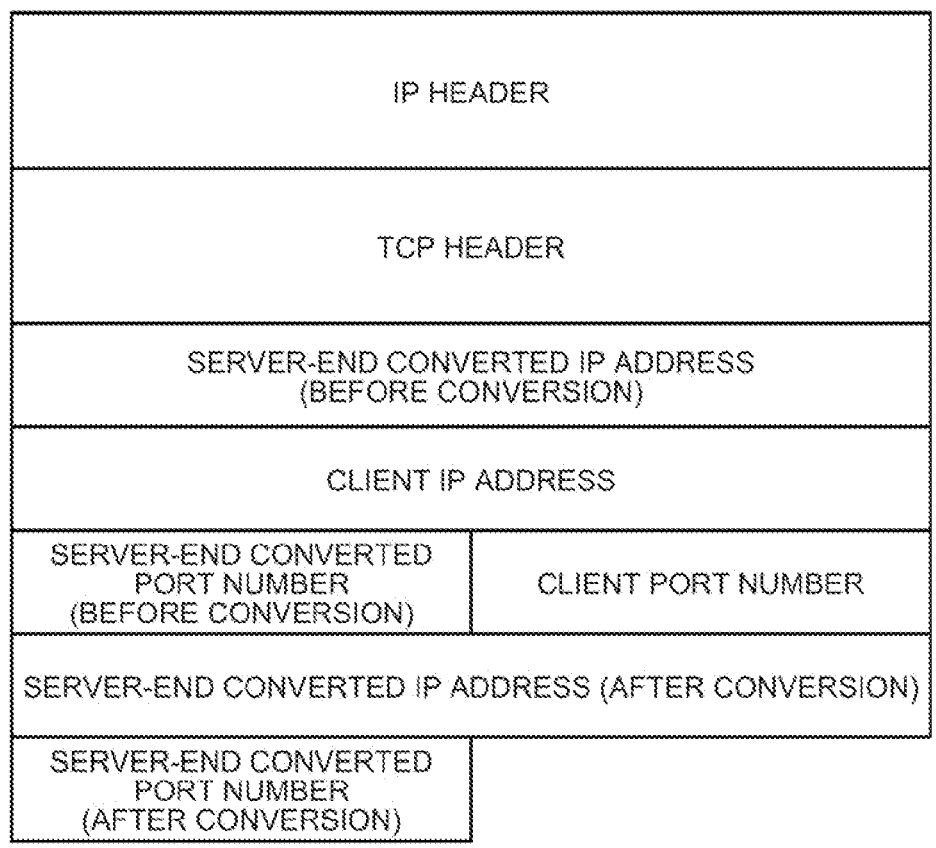
FIG. 6 is a schematic diagram illustrating an example of destination server information.
FIG. 7 is a schematic diagram illustrating an example of a connection control message received by the layer 4 switch.

Referring back to FIG. 4, the destination server information storing unit 33 stores therein information on a conversion server that corresponds to the destination server. Specifically, the destination server information storing unit 33 stores therein, in an associated manner, a reference number indicating the destination server, an IP address of each server, and a port number of each server. For example, in the example illustrated in FIG. 6, the destination server information storing unit 33 stores therein, in an associated manner, the reference number "#1" indicating the destination server, the IP address "10.10.10.22", and the port number "80". FIG. 6 is a schematic diagram illustrating an example of destination server information.

Referring back to FIG. 4, the conversion table managing unit 30 manages the address conversion table storing unit 31. Specifically, the conversion table managing unit 30 acquires a connection control message from each of the conversion servers 22 to 24. Furthermore, if the conversion table managing unit 30 acquires a connection control message from each of the conversion servers 22 to 24, the conversion table managing unit 30 converts, in accordance with the acquired connection control message, the address conversion table stored in the address conversion table storing unit 31.

In the following, the connection control message will be described. For example, in the example illustrated in FIG. 7, the connection control message stores therein an IP header indicating the layer 4 switch, a TCP header indicating the layer 4 switch, a server-end converted IP address (before conversion), and a client IP address. Furthermore, the connection control message stores therein a server-end converted port number (before conversion), a client port number, server-end converted IP address (after conversion), and a server-end converted port number (after conversion). FIG. 7 is a schematic diagram illustrating an example of the connection control message received by the layer 4 switch.

In the following, a process, performed by the conversion table managing unit 30, for converting the address conversion table in accordance with the connection control message will be described. For example, if the conversion table managing unit 30 receives a connection control message, the conversion table managing unit 30 searches the address conversion table for an entry that matches both a server-end converted IP address (before conversion) and a client IP address that are stored in the connection control message. Furthermore, the conversion table managing unit 30 also searches the address conversion table for an entry that matches both a server-end converted port number (before conversion) and a client port number that are stored in the connection control message.

Then, the conversion table managing unit 30 converts the server-end converted IP address of the searched entry to a server-end converted IP address (after conversion) of the received connection control message in the address conversion table. Furthermore, the conversion table managing unit 30 converts the server-end converted port number of the searched entry to a server-end converted port number (after conversion) of the received connection control message in the address conversion table.

Referring back to FIG. 4, if the conversion processing unit 32 receives a packet from any one of the clients 15 to 17, the conversion processing unit 32 converts, in accordance with the address conversion table stored in the address conversion table storing unit 31, the address stored in the received packet. Furthermore, if the conversion processing unit 32 receives a packet from any one of the conversion servers 22 to 24, the conversion processing unit 32 converts, in accordance with the address conversion table stored in the address conversion table storing unit 31, the address stored in the received packet.

Figure 8:
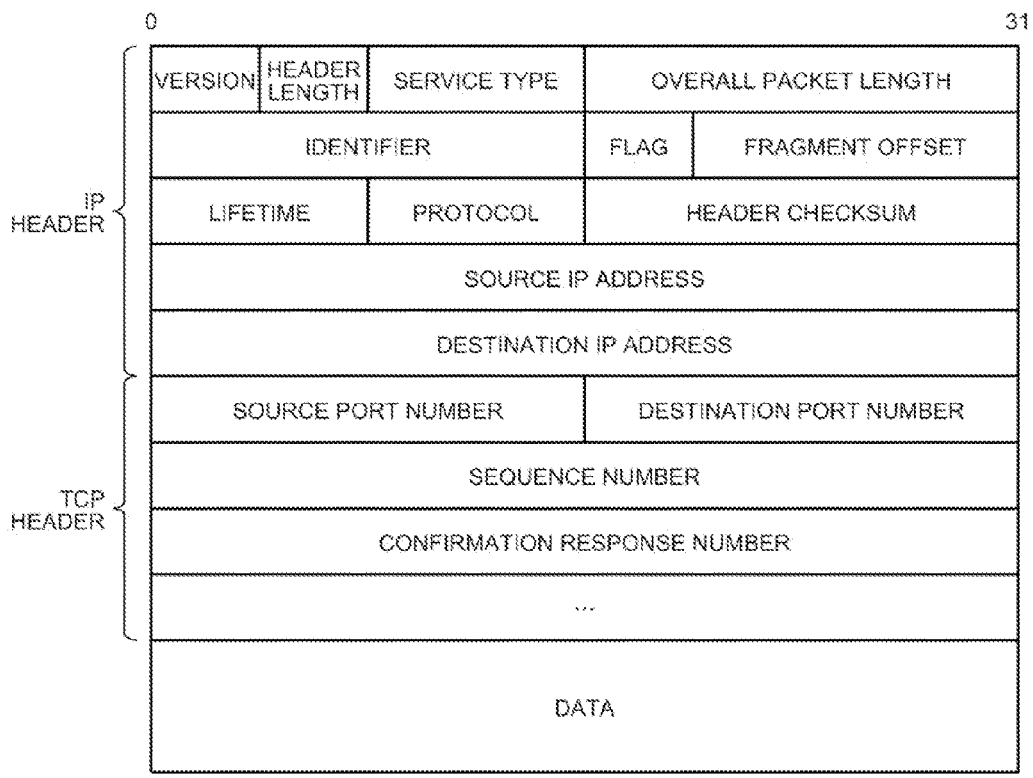
FIG. 8 is a schematic diagram illustrating an example of a packet received by the layer 4 switch.

For example, the conversion processing unit 32 receives the packet illustrated in FIG. 8 from the client 15. In the example illustrated in FIG. 8, the conversion processing unit 32 receives a packet containing an IP header, a TCP header, and data. The IP header stores therein information indicating a version, a header length, a service type, an overall packet length, an identifier, a flag, a fragment offset, a lifetime, a protocol, a header checksum, a source IP address, and a destination IP address. The TCP header stores therein, for example, a source port number, a destination port number, a sequence number, and a confirmation response number. The data stores therein a request message. FIG. 8 is a schematic diagram illustrating an example of a packet received by the layer 4 switch.

If the conversion processing unit 32 receives a packet from the client 15, the conversion processing unit 32 identifies the source IP address, the source port number, the destination IP address, and the destination port number of the packet that are stored in the received packet. Then, by using the identified IP addresses and port numbers as a key, the conversion processing unit 32 searches the address conversion table for the client IP address and port number and for the destination IP address and port number of the packet. Thereafter, if there is a hit for an entry matching the key, the conversion processing unit 32 acquires the server-end converted IP address and the server-end converted port number of the hit entry.

Furthermore, the conversion processing unit 32 converts the destination IP address and port number of the received packet to the acquired server-end converted IP address and the server-end converted port number. Then, the conversion processing unit 32 sends the packet whose destination IP address and port number are converted.

In contrast, if there is no hit for an entry matching the IP address and the port number, the conversion processing unit 32 refers to the destination server information stored in the destination server information storing unit 33. Then, from among the conversion servers stored in the destination server information, the conversion processing unit 32 randomly selects a conversion server that corresponds to the destination of the packet. In this example, a conversion server corresponding to the destination of the packet is randomly selected; however, a method of selecting a conversion server is not limited thereto. A conversion server can be selected using another method.

Furthermore, if the conversion processing unit 32 selects a conversion server that corresponds to the destination of the packet, the conversion processing unit 32 acquires the IP address and the port number of the selected conversion server from the destination server information stored in the destination server information storing unit 33. Then, the conversion processing unit 32 creates an entry in which the source IP address and port number of the received packet are used as the client IP address and port number.

Furthermore, the conversion processing unit 32 stores, in the created entry as a server-end before-conversion IP address, the destination IP address that has been stored in the received packet. The conversion processing unit 32 stores, in the created entry as a server-end before-conversion port number, the destination port number that has been stored in the received packet. The conversion processing unit 32 stores, in the created entry as a server-end converted IP address, the IP address of the conversion server that is selected as the destination server. The conversion processing unit 32 stores, in the created entry as a server-end converted port number, the port number of the conversion server that has been stored in the received packet. Then, the conversion processing unit 32 stores the created entry in the address conversion table.

In contrast, if the conversion processing unit 32 receives a packet sent from the conversion server 22, the conversion processing unit 32 identifies the source IP address and port number and the destination IP address and port number of the received packet. Then, by using the identified IP addresses and port numbers as a key, the conversion processing unit 32 searches the address conversion table for the server-end converted IP address and port number and for the client IP address and port number.

Thereafter, if there is a hit for an entry matching the key, the conversion processing unit 32 acquires a server-end pre-conversion IP address and a server-end pre-conversion port number of the hit entry. Furthermore, the conversion processing unit 32 converts the source IP address and port number of the received packet to the acquired server-end before-conversion IP address and server-end before-conversion port number. Then, the conversion processing unit 32 sends a packet in which the before-conversion IP address and before-conversion port number are converted.

In this way, the layer 4 switch converts, the destination IP address and the destination port number of the packet sent from a client, to an IP address and a port number of the destination conversion server. Furthermore, the layer 4 switch stores therein a before-conversion destination IP address and a before-conversion destination port number and converts, the source address and the source port number of the packet sent from a conversion server, to the before-conversion destination IP address and the before-conversion destination port number that are stored in the layer 4 switch.

In other words, the layer 4 switch relays a packet that is sent/received from/to a client and a conversion server while logically and uniquely maintaining the connection between the client and the conversion server.

In the following, a conversion server according to the second embodiment will be described with reference to FIG. 9. FIG. 9 is a schematic diagram illustrating the conversion server according to the second embodiment. In the following, each component included in the conversion server 22 will be described. Because the conversion server 23 and the conversion server 24 include the same components as those included in the conversion server 22, a description thereof will be omitted here.

Furthermore, in the following description, it is assumed that the client 15 sends a request message for content stored in the content server 25. Furthermore, it is assumed that a message sent from the client 15 is distributed to the conversion server 22. It is assumed that the client 16 sends a request message for content stored in the content server 26 and a message sent from the client 16 is distributed to the conversion server 24. Furthermore, it is assumed that the conversion server 22 acquires an assignment request message, which will be described later, from the conversion server 24 and converts the content stored in the content server 26.

As illustrated in FIG. 9, the conversion server 22 includes a destination determination table unit 34, a responsible server management table unit 35, a layer 4 switch control address information storing unit 36, a cache management table unit 37, a content conversion table unit 38, and a cache storing unit 47. Furthermore, the conversion server 22 also includes a TCP managing unit 39, a destination determining unit 40, a responsible server managing unit 41, an assignment control unit 42, an assignment receiving unit 43, a cache managing unit 44, a content conversion processing unit 45, and a TCP managing unit 46.

The destination determination table unit 34 is a storing unit that stores therein a destination determination table. For example, as illustrated in FIG. 10, the destination determination table unit 34 stores therein the destination determination table in which a request-uniform resource identifier (URI) and an IP address and port number of a content server that stores therein content are associated. FIG. 10 is a schematic diagram illustrating an example of information stored in the destination determination table unit.

The Request-URI mentioned here is information uniquely indicating content requested to be sent from each of the clients 15 to 17. For example, the destination determination table unit 34 stores therein the destination determination table in which the Request-URI "/contents/A1", the IP address "10.10.100.25", and the port number "80" are associated with each other.

Referring back to FIG. 9, the responsible server management table unit 35 stores therein a combination of type information indicating the client type and content information indicating content. Furthermore, the responsible server management table unit 35 associates the combination of the type information and the content information with the server information that uniquely indicates a conversion server that converts the format of the content indicated by the content information to the format that can be used by the client type indicated by the type information. Then, the responsible server management table unit 35 stores therein the associated information.

Specifically, the responsible server management table unit 35 stores therein a responsible server management table in which a Request-URI, a User-Agent, a cache ID, a responsible server IP address, a responsible server receiving port number, and a responsible server control port number are associated with each other.

The User-Agent mentioned here is information indicating the client type and is, for example, information indicating a browser used by a client. The cache ID is the number uniquely indicating a cache of the content whose format is converted so as to be used by a client.

For example, in the example illustrated in FIG. 11, the responsible server management table unit 35 stores therein a responsible server management table in which the Request-URI "/contents/A1", the User-Agent "XXX/1.0/xxx", and the cache ID "1" are associated. Furthermore, the responsible server management table unit 35 stores therein the responsible server management table in which the cache ID "1" is associated with the responsible server IP address "10.10.10.23", the responsible server receiving port number "80", and the responsible server control port number "1111". FIG. 11 is a schematic diagram illustrating an example of the responsible server management table.

In the following, the cache ID will be described in detail. The cache ID is a number that uniquely indicates a converted content and is a number that is uniquely determined in accordance with the Request-URI and the User-Agent. For example, in the example illustrated in FIG. 11, the responsible server management table unit 35 stores therein a converted content that is converted, from the content stored in the "/contents/A1" whose IP address is "10.10.100.23", to the format that can be used by "XXX/1.0/xxx" stored as the cache ID "1".

In other words, for the converted content, because a cache to be stored varies in accordance with the combination of client type and conversion source content, a cache ID is determined in advance for each combination of the client type that sends a request for content and conversion source content.

Referring back to FIG. 9, the layer 4 switch control address information storing unit 36 stores therein the IP address of the layer 4 switch and the control port number of the layer 4 switch. For example, in the example illustrated in FIG. 12, the layer 4 switch control address information storing unit 36 associates the IP address "10.10.10.254" of the layer 4 switch with the port number "1111" of the layer 4 switch control and stores them in the layer 4 switch control address information storing unit 36. FIG. 12 is a schematic diagram illustrating an example of layer 4 switch control address information.

Referring back to FIG. 9, the cache management table unit 37 stores therein a cache in which content is converted in accordance with the client type. For example, in the example illustrated in FIG. 13, the cache management table unit 37 stores therein, in an associated manner, the cache ID "1", the cache existence/nonexistence "1", and the cache storage area "/cache/1". FIG. 13 is a schematic diagram illustrating an example of the cache management table.

If converted content is stored in the cache in the conversion server 22, "1" is stored in the item of cache existence/nonexistence, whereas if converted content is not stored in the cache in the conversion server 22, "0" is stored in the item of cache existence/nonexistence. For example, in the example illustrated in FIG. 13, the cache management table unit 37 stores therein the converted content that is denoted by the cache ID "1" and that is stored in the storage area "/cache/1" in the cache storing unit 47 included in the conversion server 22.

Referring back to FIG. 9, the content conversion table unit 38 is a storing unit that stores therein a content conversion table. Specifically, the content conversion table unit 38 stores therein, in an associated manner, a cache ID, a before-conversion content type, and a converted content type. For example, in the example illustrated in FIG. 14, the content conversion table unit 38 stores therein, in an associated manner, the cache ID "1", the before-conversion content type "hyper text markup language (HTML)", and the converted content type "compact HTML (CHTML)". FIG. 14 is a schematic diagram illustrating an example of the content conversion table.

Referring back to FIG. 9, the cache storing unit 47 is a cache that stores therein converted content. For example, the cache storing unit 47 stores therein the content whose format is converted to the format that can be used by the client 15.

The TCP managing unit 39 is an end device that performs TCP communication in accordance with the control performed by the assignment control unit 42, the assignment receiving unit 43, and the cache managing unit 44, which will be described later. Specifically, the TCP managing unit 39 receives, via the layer 4 switch, a packet sent from the client 15. Then, the TCP managing unit 39 performs a termination process on the received packet and sends data stored in the packet to the destination determining unit 40. Furthermore, the TCP managing unit 39 notifies the assignment control unit 42 of the IP address and the port number of the client 15 that corresponds to the source of the received packet. The TCP managing unit 39 also notifies the assignment control unit 42 of the sequence number and the confirmation response number that are stored in the received packet.

Furthermore, the TCP managing unit 39 receives data from the assignment control unit 42, the assignment receiving unit 43, and the cache managing unit 44, which will be described later. Then, the TCP managing unit 39 sends the acquired data to the clients 15 to 17 via the layer 4 switch 21.

For example, the TCP managing unit 39 receives, from the client 15 via the layer 4 switch 21, the request message illustrated in FIG. 15. FIG. 15 is a schematic diagram illustrating an example of the request message. In the example illustrated in FIG. 15, the request message stores therein an IP header, a TCP header, and a layer 7 protocol header. The TCP managing unit 39 performs the termination process on the IP header and the TCP header and sends the layer 7 protocol header to the destination determining unit 40.

Referring back to FIG. 9, if the destination determining unit 40 receives a request message that requests the sending of content from the client 15, the destination determining unit 40 analyzes the received request message. Then, the destination determining unit 40 distinguishes between the User-Agent indicating the type of the client 15 and the Request-URI indicating the content to be sent requested by the client 15. Specifically, the destination determining unit 40 receives the layer 7 protocol header from the TCP managing unit 39. Furthermore, the destination determining unit 40 analyzes the received layer 7 protocol header and distinguishes between the User-Agent included and the Request-URI in the layer 7 protocol header.

Furthermore, the destination determining unit 40 acquires, from the destination determination table, both the IP address and the port number of the content server 25 that are associated with the distinguished Request-URI. Then, the destination determining unit 40 sends the distinguished User-Agent, the Request-URI, and the acquired IP address and the port number of the content server 25 to the responsible server managing unit 41.

For example, if the destination determining unit 40 receives the layer 7 protocol header illustrated in FIG. 15, the destination determining unit 40 identifies the User-Agent "XXX/1.0/xxx/12345" from the received layer 7 protocol header. Furthermore, the destination determining unit 40 identifies the Request-URI "/contents/A1" from the received layer 7 protocol header.

Furthermore, the destination determining unit 40 acquires, from the destination determination table illustrated in FIG. 10, the IP address "10.10.100.25" and the port number "80" of the content server 25 that are associated with "/contents/A1". Then, the destination determining unit 40 sends the User-Agent "XXX/1.0/xxx/12345" and the Request-URI "/contents/A1" to the responsible server managing unit 41. Furthermore, the destination determining unit 40 sends the IP address "10.10.100.25" and the port number "80" of the content server 25 to the responsible server managing unit 41.

Referring back to FIG. 9, the responsible server managing unit 41 specifies, from the responsible server management table, the IP address of the conversion server stored in association with the combination of the User-Agent and the Request-URI identified by the destination determining unit 40. Specifically, the responsible server managing unit 41 receives, from the destination determining unit 40, the User-Agent, the Request-URI, and IP address and port number of the content server 25.

Then, the responsible server managing unit 41 specifies, from the responsible server management table unit 35, the IP address, the receiving port number, and the control port number of the conversion server that are associated with the received User-Agent and Request-URI. Furthermore, the responsible server managing unit 41 acquires, from the responsible server management table unit 35, the cache ID that is associated with the User-Agent and the Request-URI.

Furthermore, the responsible server managing unit 41 determines whether the specified IP address of the conversion server is the IP address of its own conversion server. Then, if the responsible server managing unit 41 determines that the specified IP address is the IP address of its own conversion server, the responsible server managing unit 41 sends the acquired cache ID to the cache managing unit 44.

In contrast, if the responsible server managing unit 41 determines that the specified IP address is not the IP address of its own conversion server, the responsible server managing unit 41 notifies the assignment control unit 42 of the specified IP address, receiving port number, control port number, and the cache ID. Furthermore, if the responsible server managing unit 41 determines that the specified IP address is not the IP address of its own conversion server, the responsible server managing unit 41 notifies the assignment control unit 42 of the IP address and the port number of the content server 25.

In the following, a process performed by the responsible server managing unit 41 included in the conversion server 22 will be described in detail. In the following description, it is assumed that the IP address of the conversion server 22 is "10.10.10.22" and the IP address of the conversion server 23 is "10.10.10.23".

For example, the responsible server managing unit 41 receives, from the destination determining unit 40, the User-Agent "XXX/1.0/xxx/12345" and the Request-URI "/contents/A1". Furthermore, the responsible server managing unit 41 receives, from the destination determining unit 40, the IP address "10.10.100.25" and the port number "80" of the content server 25.

Then, the responsible server managing unit 41 specifies the IP address, the receiving port number, and the control port number of the conversion server that are associated with the combination of the User-Agent "XXX/1.0/xxx/12345" and the Request-URI "/contents/A1". In the example illustrated in FIG. 11, the combination of "XXX/1.0/xxx/12345" and "/contents/A1" is stored, in advance, in the responsible server management table.

In this example, the responsible server managing unit 41 acquires the IP address "10.10.10.23", the receiving port number "80", and the control port number "1111" of the conversion server 23 that corresponds to the responsible server associated with the searched combination.

Furthermore, the responsible server managing unit 41 determines whether the acquired IP address "10.10.10.23" is the IP address of its own conversion server. In this case, because the IP address of the conversion server 22 is "10.10.10.22", the responsible server managing unit 41 determines that the acquired IP address of the responsible server is not the IP address of its own conversion server.

Accordingly, the responsible server managing unit 41 notifies the assignment control unit 42 of the acquired cache ID "1", the acquired IP address "10.10.10.23" of the responsible server, the acquired receiving port number "80" of the responsible server, and the acquired control port number "1111" of the responsible server.

Referring back to FIG. 9, the assignment control unit 42 notifies the conversion server that is indicated by the IP address specified by the responsible server managing unit 41 of the cache ID specified by the responsible server managing unit 41. Furthermore, the assignment control unit 42 sends, to the conversion server that is indicated by the IP address specified by the responsible server managing unit 41, connection information indicating the connection established with the client.

Furthermore, if the assignment control unit 42 receives the connection information from the conversion server that is indicated by the IP address specified by the responsible server managing unit 41, the assignment control unit 42 sends, to the content server 25 using the received information, the request message received from the client 15.

Specifically, the assignment control unit 42 acquires, from the responsible server managing unit 41, a notification indicating the IP address, the receiving port number, and the control port number of the conversion server 23 and the cache ID acquired by the responsible server managing unit 41. Furthermore, the assignment control unit 42 acquires, from the responsible server managing unit 41, a notification indicating the IP address and the port number of the content server 25. Furthermore, the assignment control unit 42 acquires, from the TCP managing unit 39, a notification indicating the IP address and the port number of the client 15 that is the source of the request message. Then, the assignment control unit 42 creates an assignment request message containing therein the various pieces of acquired information.

Figure 16:
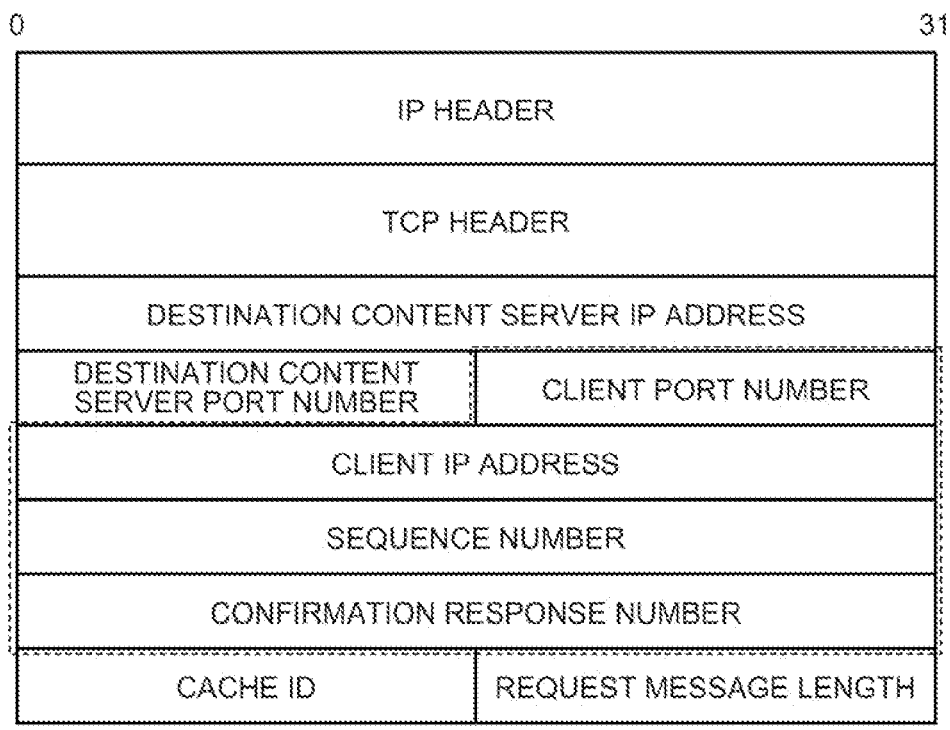
FIG. 16 is a schematic diagram illustrating an example of an assignment request message.

FIG. 16 is a schematic diagram illustrating an example of the assignment request message. In the example illustrated in FIG. 16, the assignment control unit 42 stores the IP address of the conversion server 23 in the IP header of the assignment request message and stores the receiving port number of the conversion server 23 in the TCP header of the assignment request message. Furthermore, the assignment control unit 42 stores the IP address of the content server 25 in the destination content server IP address of the assignment request message and stores the port number of the content server 25 in the destination content server port number of the assignment request message.

Furthermore, the assignment control unit 42 stores the IP address of the client 15 in the client IP address of the assignment request message and stores the port number of the client 15 in the client port number of the assignment request message. Furthermore, the assignment control unit 42 stores, in the assignment request message, a sequence number, a confirmation response number, a cache ID, and a request message length.

Furthermore, if the assignment control unit 42 creates an assignment request message, the assignment control unit 42 sends the assignment request message to the responsible server. Specifically, the assignment control unit 42 sends the assignment request message to the conversion server 23 that is associated with the combination of the type of the client 15 and the content to be sent requested by the client 15.

Furthermore, the assignment control unit 42 receives, from the conversion server 23 to which the assignment request message is sent, an assignment response message that is a response to the assignment request message. Then, if the assignment control unit 42 receives the assignment response message, the assignment control unit 42 acquires server-end connection information from the received assignment response message.

Figure 17:
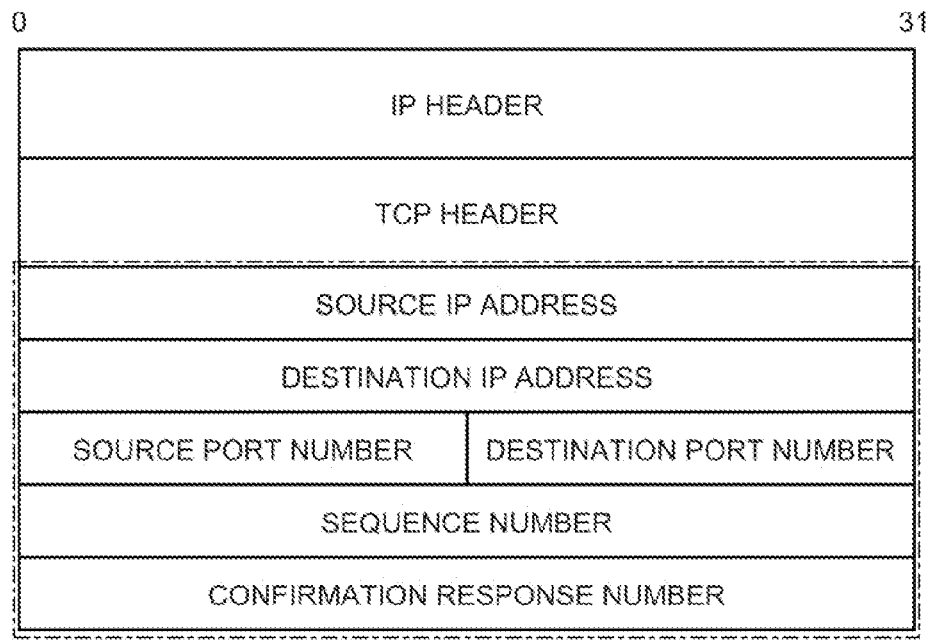
FIG. 17 is a schematic diagram illustrating an example of an assignment response message.

The assignment response message mentioned here is a message that is sent, as a response to the assignment request message, from the conversion server 23 to which the assignment request message has been sent. The assignment response message contains the server-end connection information that is information on the connection established between the conversion server 23 and the content server 25. For example, in the example illustrated in FIG. 17, the assignment response message contains an IP header and a TCP header that contain the IP address and the port number of the conversion server 22, respectively. Furthermore, the assignment response message contains, as server-end connection information, a source IP address, a destination IP address, a source port number, a destination port number, a sequence number, and a confirmation response number. FIG. 17 is a schematic diagram illustrating an example of the assignment response message.

In the server-end connection information, the source IP address and the source port number mentioned here are the IP address and the port number, respectively, of the conversion server 23 that sends the assignment response message. Furthermore, the destination IP address and the port number mentioned here are the address and the port number, respectively, of the content server that stores therein content for a send request. Furthermore, the sequence number mentioned here is a sequence number of the connection that is established between the conversion server 23 and the content server 25. The confirmation response number mentioned here is a confirmation response number of the connection that is established between the conversion server 23 and the content server 25.

Furthermore, the assignment control unit 42 creates a connection control message using the acquired server-end connection information. The assignment control unit 42 acquires a layer 4 switch control address from the layer 4 switch control address information storing unit 36. Then, the assignment control unit 42 sends the created connection control message using the acquired layer 4 switch control address.

Furthermore, the assignment control unit 42 sets the acquired server-end connection information in the TCP managing unit 46. The assignment control unit 42 divides the request message received from the client 15 into packets and sends them to the TCP managing unit 46. Specifically, the assignment control unit 42 sends the request message received from the client 15 to the content server 25 via the TCP managing unit 46.

Furthermore, the assignment control unit 42 receives an acknowledgement (Ack) that is a response to the request message sent to the content server 25 via the conversion server 23 that sends the assignment request message. If the assignment control unit 42 receives an Ack, the assignment control unit 42 determines whether all of the request messages are sent to the conversion server 25. If the assignment control unit 42 determines that all of the request messages are sent to the conversion server 25, the assignment control unit 42 sends, to the conversion server 23, an ACK release notification that is a notification of releasing the transferring of the Ack.

Furthermore, the assignment control unit 42 sends the request message to the content server 25 by using the connection established between the conversion server 23 and the content server 25. Accordingly, the content server 25 sends the Ack to the conversion server 23. Thus, the conversion server 22 receives, via the conversion server 23, the Ack that is sent from the content server 25.

Figure 18:
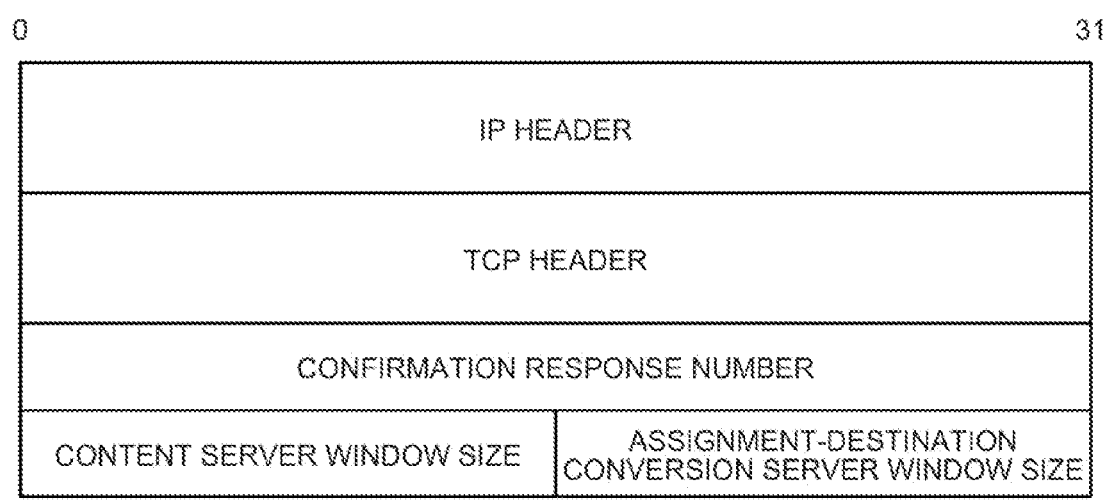
FIG. 18 is a schematic diagram illustrating an example of an Ack sent from an assignment-destination conversion server to an assignment-source conversion server.

An example of the Ack that is received by the assignment control unit 42 as a response to the request message is illustrated in FIG. 18. In the example illustrated in FIG. 18, the Ack contains an IP header and a TCP header in which the IP address and the port number of the conversion server 22 are contained. Furthermore, the Ack contains the confirmation response number of the connection established between the conversion server 23 and the content server 25. Furthermore, the Ack contains a content server window size that is the window size of the content server 25 and an assignment-destination conversion server window size that is the window size of the conversion server 23. FIG. 18 is a schematic diagram illustrating an example of the Ack sent from the assignment-destination conversion server to the assignment-source conversion server.

In the following, processes performed by the assignment control unit 42 will be specifically described. First, from among the processes performed by the assignment control unit 42, a process for sending the assignment request message will be specifically described. For example, the assignment control unit 42 receives, from the responsible server managing unit 41, a notification indicating the cache ID "1", the IP address "10.10.10.23" of the responsible server, the receiving port number "80" of the responsible server, and the control port number "1111" of the responsible server.

Furthermore, the assignment control unit 42 receives, from the responsible server managing unit 41, a notification indicating the IP address "192.0.2.254" and the port number "10000" of the client 15. The assignment control unit 42 acquires, from the TCP managing unit 39, the sequence number "1001" and the confirmation response number "0002" that are used for the connection with the client 15.

Then, the assignment control unit 42 creates an assignment request message that contains the destination content server IP address "10.10.100.25", the client IP address "192.0.2.254", and the destination content server port number "80". Furthermore, the assignment control unit 42 stores, in the assignment request message, the client port number "10000", the client IP address "192.0.2.254", the sequence number "2001", and the confirmation response number "5001". The assignment control unit 42 also stores, in the assignment request message, the cache ID "1" and the request message length "50 bytes".

Then, the assignment control unit 42 stores, in the TCP/IP header of the assignment request message, both the IP address "10.10.10.23" of the conversion server 23 that is the responsible server and the receiving port number "80" of the responsible server and then sends assignment information to the conversion server 23.

Furthermore, the assignment control unit 42 receives, as an assignment response message from the conversion server 23 that has sent the assignment request message, the assignment response message that contains the source IP address "10.10.10.23" and the destination IP address "10.10.100.25". Furthermore, the assignment control unit 42 receives, as an assignment response message, the assignment response message that contains the source port number "80", the destination port number "80", the sequence number "5001", and the confirmation response number "2002".

Then, the assignment control unit 42 creates a connection control message in which the server-end converted IP address (before conversion) contains the IP address "10.10.10.22" of its own conversion server. Furthermore, the assignment control unit 42 stores, in the client IP address of the connection control message, the IP address "192.0.2.254" of the client 15 and stores, in the server-end converted port number (before conversion), the port number "80" of its own conversion server.

Furthermore, the assignment control unit 42 stores "10000" in the client port number of the connection control message and stores "10.10.10.23" in the server-end converted IP address (after conversion). Furthermore, the assignment control unit 42 stores "80" in the server-end converted port number (after conversion). Then, the assignment control unit 42 sends, to the conversion table managing unit 30 in the layer 4 switch 21, the connection control message containing information.

In the following, from among the processes performed by the assignment control unit 42, a process for requesting content from a content server will be specifically described. First, the assignment control unit 42 receives the assignment response message from the conversion server 23. Then, the assignment control unit 42 sets, in the TCP managing unit 46, the destination IP address "10.10.100.25" and the destination port number "80" that are server-end connection information and that are contained in the received assignment response message.

Furthermore, the assignment control unit 42 sets, in the TCP managing unit 46, the sequence number "5001" and the confirmation response number "2002". Then, the assignment control unit 42 divides the request message received from the client 15 into packets and sends them to the TCP managing unit 46.

As will be described later, the TCP managing unit 46 sends the request message using the set server-end connection information. Specifically, the TCP managing unit 46 sends, as the TCP managing unit included in the conversion server 23, the request message to the content server 25. Accordingly, the conversion server 22 can send a request to a content server by using the connection established between the conversion server 23 and the content server 25.

Subsequently, the assignment control unit 42 receives the Ack that is sent from the content server 25 via the conversion server 23. Then, if all of the packets of the request message have been sent, the assignment control unit 42 sends an ACK release notification to the conversion server 23.

Referring back to FIG. 9, if the assignment receiving unit 43 receives the assignment request message from the conversion server 24, the assignment receiving unit 43 acquires the destination content server IP address and the destination content server port number that are contained in the received assignment request message. Furthermore, the assignment receiving unit 43 acquires client-end connection information, a cache ID, and a request message length contained in the assignment request message.

Then, the assignment receiving unit 43 sends, to the cache managing unit 44, the acquired cache ID and the acquired client-end connection information. Furthermore, the assignment receiving unit 43 sends, to the TCP managing unit 46, the acquired destination content server IP address and the acquired destination content server port number.

Furthermore, the assignment receiving unit 43 receives, from the TCP managing unit 46, connection information on the connection established, by the TCP managing unit 46 which will be described later, with a content server. Furthermore, the assignment receiving unit 43 creates an assignment response message. Then, the assignment receiving unit 43 sends the created assignment response message to the conversion server 24 that is the source of the assignment request message. If the assignment receiving unit 43 does not receive an ACK transfer release notification from the conversion server 24, the assignment receiving unit 43 sends the Ack to the conversion server 24.

The cache managing unit 44 receives a notification of the cache ID from the assignment receiving unit 43. Furthermore, the cache managing unit 44 determines whether the converted content associated with the notified cache ID is stored in the cache management table unit 37.

Furthermore, if the cache managing unit 44 determines that the converted content is stored in the cache management table unit 37, the cache managing unit 44 sends the converted content to the client 16. If the cache managing unit 44 determines that the converted content is not stored in the cache management table unit 37, the cache managing unit 44 sends, to the client 16, the content whose format has been converted by the content conversion processing unit 45, which will be described later. The cache managing unit 44 sends the converted content to the client 16 using the information indicating the connection established between the conversion server 24 and the client 16.

Furthermore, if the content conversion processing unit 45, which will be described later, converts the format of the content, the cache managing unit 44 stores, as the converted content in the cache storing unit 47 in the conversion server 22, the content whose format has been converted.

Specifically, the cache managing unit 44 receives the cache ID from the assignment receiving unit 43. Then, the cache managing unit 44 searches the cache management table stored in the cache management table unit 37 for the received cache ID. The cache managing unit 44 determines whether the cache indicated by the searched cache ID is stored.

If the cache managing unit 44 determines that the cache indicated by the searched cache ID is stored, the cache managing unit 44 acquires the cache indicated by the searched cache ID. Then, the cache managing unit 44 creates a response message that contains the acquired cache.

Figure 19:
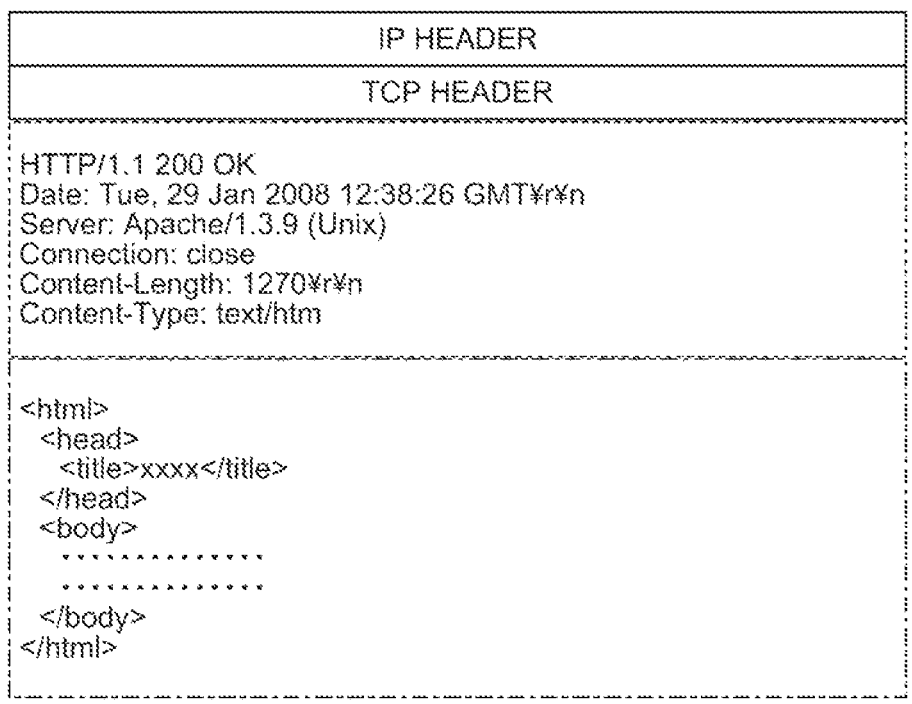
FIG. 19 is a schematic diagram illustrating an example of a response message.

FIG. 19 is a schematic diagram illustrating an example of the response message. In the example illustrated in FIG. 19, the cache managing unit 44 creates a response message that contains an HTML text that corresponds to the acquired cache. Then, the cache managing unit 44 sends the data of the created response message to the client 16 via the TCP managing unit 39.

In contrast, if the cache managing unit 44 determines that the cache indicated by the cache ID is not stored, the cache managing unit 44 creates a request message for content and sends the created request message to the content server 26. Specifically, the cache managing unit 44 establishes the server-end connection with the content server 26. Then, the cache managing unit 44 sends, to the assignment receiving unit 43, information on the established server-end connection.

Furthermore, the cache managing unit 44 acquires, as a response to the request message that is sent from the conversion server 24 to the content server 26, content stored in the content server 26. Then, if the content conversion processing unit 45, which will be described later, converts the format of the acquired content, the cache managing unit 44 acquires the converted content from the content conversion processing unit 45. Then, the cache managing unit 44 stores the acquired converted content in the cache storing unit 47 in the conversion server 22.

Furthermore, the cache managing unit 44 sets the flag representing the existence/nonexistence of the stored cache that is associated with the cache ID to "1". Then, the cache managing unit 44 sends the converted content to the client 16.

If the cache managing unit 44 determines that the converted content is not stored in the cache in the conversion server 22, the content conversion processing unit 45 converts the content stored in the content server 26 to the format that can be used by the client 16. Specifically, if the cache managing unit 44 determines that the converted content is not stored in the cache in the conversion server 22, the content conversion processing unit 45 acquires the content that is stored in the content server 26. Furthermore, the content conversion processing unit 45 acquires the cache ID that is sent from the conversion server 24.

Then, the content conversion processing unit 45 searches the content conversion table unit 38 using the acquired cache ID as a key and distinguishes between the format of the before-conversion content and the format of the converted content. Thereafter, the content conversion processing unit 45 converts the content acquired from the content server 26 to the format of the determined converted content. The content conversion processing unit 45 sends the converted content to the cache managing unit 44.

The TCP managing unit 46 sends, to the content server 25 in accordance with the server-end connection information received from the assignment control unit 42, the request message. By using the client-end connection information received by the assignment receiving unit 43, the TCP managing unit 46 establishes the connection with the content server 26. Furthermore, if the TCP managing unit 46 receives content from the content server 26, the TCP managing unit 46 transfers the received content to the content conversion processing unit 45 via the cache managing unit 44.

Figure 20:
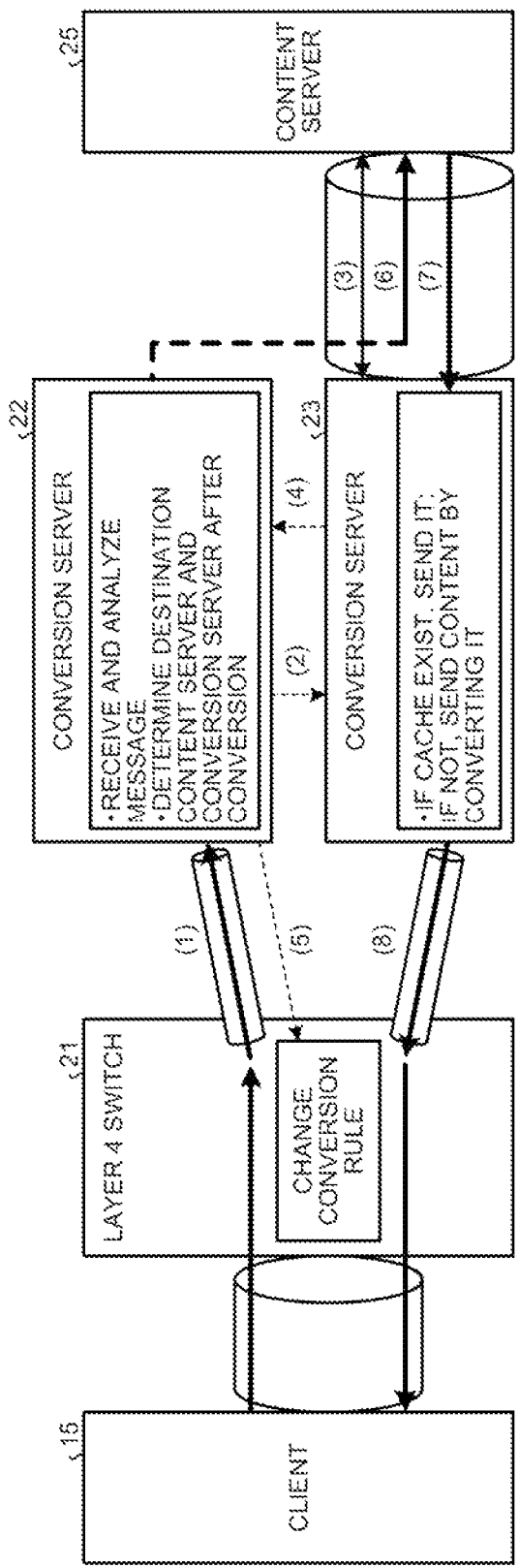
FIG. 20 is a schematic diagram illustrating the flow of a process performed by the content conversion system.

In the following, the flow of a process performed by the content conversion system will be described with reference to FIG. 20. FIG. 20 is a schematic diagram illustrating the flow of the process performed by the content conversion system. In the example illustrated in FIG. 20, it is assumed that the conversion server 23 is a conversion server that is associated with the combination of the type information "CL_A", indicating the terminal type of the client 15, and the content information "A1", indicating the content stored in the content server 25.

First, the client 15 sends a request message to the layer 4 switch 21. When the layer 4 switch 21 receives the request message, the layer 4 switch 21 sends the request message to the conversion server 22 that is the randomly selected conversion server. The conversion server 22 analyzes the request message and determines a destination content server. Furthermore, the conversion server 22 specifies the IP address of the conversion server 23 that is associated with the combination of the type information "CL_A" and the content information "A1".

Then, the conversion server 22 sends an assignment request message to the specified conversion server 23. If the conversion server 23 receives the assignment request message, the conversion server 23 establishes the connection with the content server 26. Then, the conversion server 23 creates an assignment response message that contains connection information on the established connection and sends the created assignment response message to the conversion server 22.

If the conversion server 22 receives the assignment response message from the conversion server 23, the conversion server 22 analyzes the connection information, in the received assignment response message, on the connection established between the conversion server 23 and the content server 26. Then, the conversion server 22 sends, to the content server 25 using the analyzed connection information, the request message sent from the client 15. In other words, when sending the request message to the content server 25, the conversion server 22 acts as if it is the conversion server 23.

Furthermore, the conversion server 22 converts, using a connection control message, the address conversion table in the layer 4 switch 21. Specifically, the conversion server 22 sets the layer 4 switch 21 in such a manner that the information sent from the conversion server 23 is sent to the client 15.

Then, the content server 25 sends the content indicated by the content information "A1" to the conversion server 23. If the conversion server 23 receives the content indicated by the content information "A1", the conversion server 23 determines whether the content, whose format is converted from the format of the content indicated by the content information "A1" to the format that can be used by the client 15, is stored in the cache.

Then, if the conversion server 23 determines that the converted content is stored in the cache, the conversion server 23 sends, to the client 15 via the layer 4 switch 21, the converted content stored in the cache. In contrast, if the conversion server 23 determines that the converted content is not stored in the cache, the conversion server 23 converts the format of the content received from the content server 25 to the format that can be used by the client 15. Then, the conversion server 23 sends the converted content to the client 15 via the layer 4 switch 21.

Figure 21:
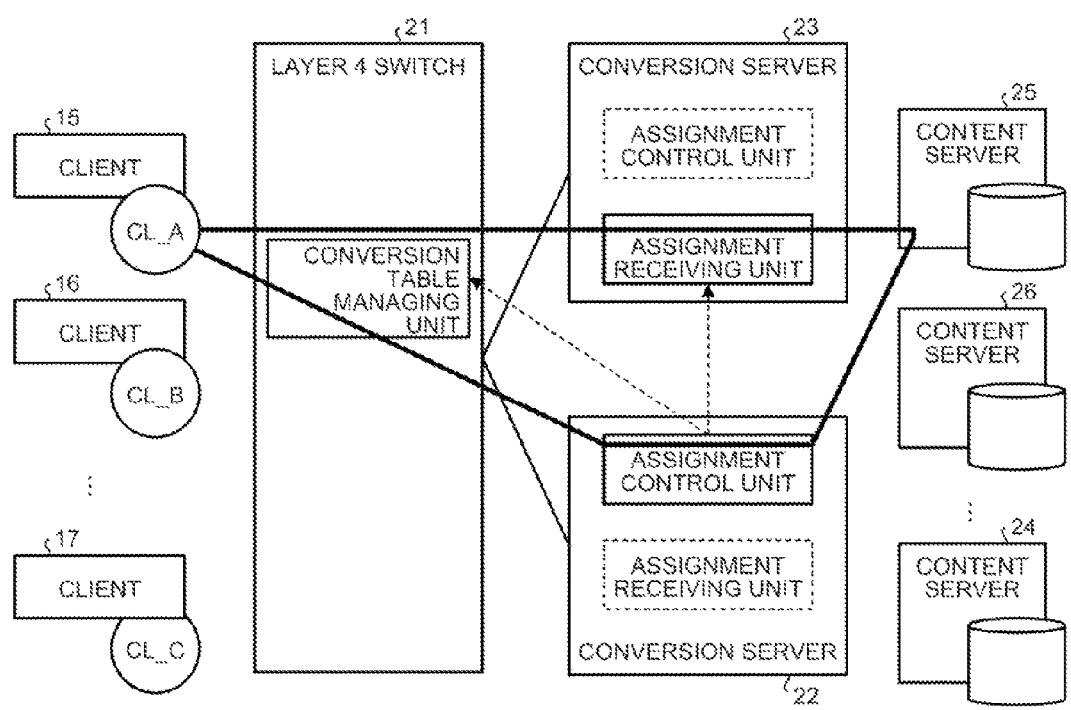
FIG. 21 is a schematic diagram illustrating the flow of data.

In this way, the conversion servers 22 to 24 request the assigning of the process from the conversion server that is associated with a combination of the terminal type of the client and the content to be sent. For example, in the example illustrated in FIG. 21, the conversion server 23 is associated with the combination of the terminal type "CL_A" and the content stored in the content server 25. FIG. 21 is a schematic diagram illustrating the flow of data. In such a case, if the conversion server 22 receives, from the client 15 having the terminal type "CL_A", a request for sending the content stored in the content server 25, the conversion server 22 assigns the process to the conversion server 23.

Specifically, if any one of the conversion servers 22 to 24 receives, from the terminal having the terminal type "CL_A", a request for sending the content stored in the content server 25, the process is always assigned to the conversion server 23. Accordingly, if any one of the conversion servers 22 to 24 stores therein the cache, the process is assigned to the conversion server that stores therein the cache.

As a result, while guaranteeing a cache hit, the conversion servers 22 to 24 do not need to synchronize the cache across each of the conversion servers 22 to 24 and thus exhibit a processing performance that is proportional to the number of conversion servers.

Furthermore, instead of sending the request message to the conversion server 23, the conversion server 22 sends, to the conversion server 23, only information necessary for the conversion server 23 acquiring the content. In other words, the conversion servers 22 to 24 guarantee a cache hit simply by sending and receiving a small amount of data between two conversion servers.

For example, the conversion table managing unit 30, the conversion processing unit 32, the TCP managing unit 39, the destination determining unit 40, the responsible server managing unit 41, the assignment control unit 42, the assignment receiving unit 43, the cache managing unit 44, the content conversion processing unit 45, and the TCP managing unit 46 are electronic circuits. In the embodiments, examples of the electronic circuits include an integrated circuit, such as an application specific integrated circuit (ASIC) or field programmable gate array (FPGA), a central processing unit (CPU), and a micro processing unit (MPU).

Furthermore, the address conversion table storing unit 31, the destination server information storing unit 33, the destination determination table unit 34, the responsible server management table unit 35, the layer 4 switch control address information storing unit 36, the cache management table unit 37, and the cache storing unit 47 are storing units. Furthermore, the content conversion table unit 38 is a storing unit. In the embodiments, examples of the storing units include a semiconductor memory device, such as a random access memory (RAM), a read only memory (ROM), or a flash memory, a hard disc drive, and an optical disk.

Flow of the process performed by the layer 4 switch

Figure 22:
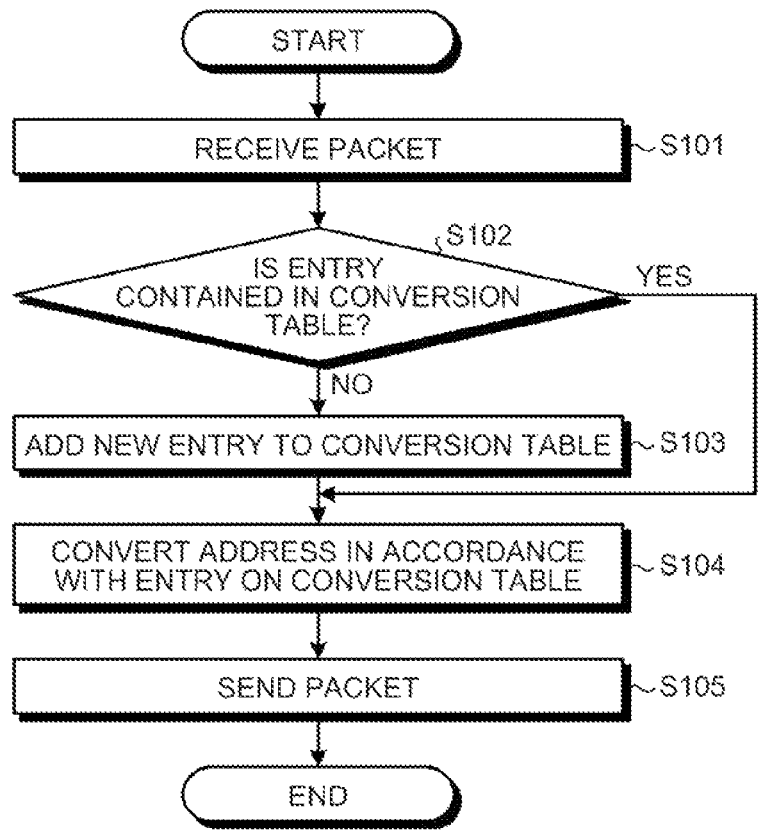
FIG. 22 is a flowchart illustrating the flow of a process performed by the layer 4 switch.
Figure 23:
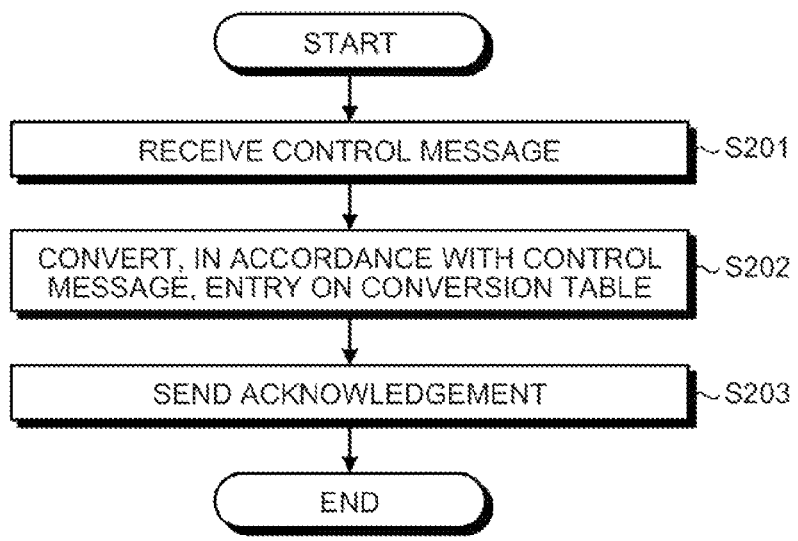
FIG. 23 is a flowchart illustrating the flow of a process performed by the layer 4 switch that has received a control message.

In the following, the flow of the process performed by the layer 4 switch 21 will be described with reference to FIGS. 22 and 23. FIG. 22 is a flowchart illustrating the flow of a process performed by the layer 4 switch. FIG. 23 is a flowchart illustrating the flow of the process performed by the layer 4 switch that has received a control message.

If the layer 4 switch 21 receives a packet (Step S101), the layer 4 switch 21 determines whether an entry that is used for converting the TCP/IP header of the received packet is in the conversion table (Step S102). If the layer 4 switch determines that the entry is stored in the conversion table (Yes at Step S102), the layer 4 switch converts, in accordance with the entry on the conversion table that has been stored in the conversion table, the TCP/IP header of the received packet (Step S104).

In contrast, if the layer 4 switch 21 determines that the entry is not stored in the conversion table (No at Step S102), the layer 4 switch 21 creates a new entry (Step S103). Then, the layer 4 switch 21 converts, in accordance with the entry on the conversion table that has been stored in the conversion table, the TCP/IP header of the received packet (Step S104). Then, the layer 4 switch 21 sends the packet whose TCP/IP header is converted (Step S105).

In the following, the flow of a process performed by the layer 4 switch 21 that has received a control message will be described with reference to FIG. 23. If the layer 4 switch 21 receives a control message from the conversion server 23 (Step S201), the layer 4 switch 21 converts, in accordance with the control message, the entry on the conversion table (Step S202). Then, the layer 4 switch 21 sends an Ack to the conversion server that corresponds to the source of the entry control message (Step S203) and completes the process.

Figure 24:
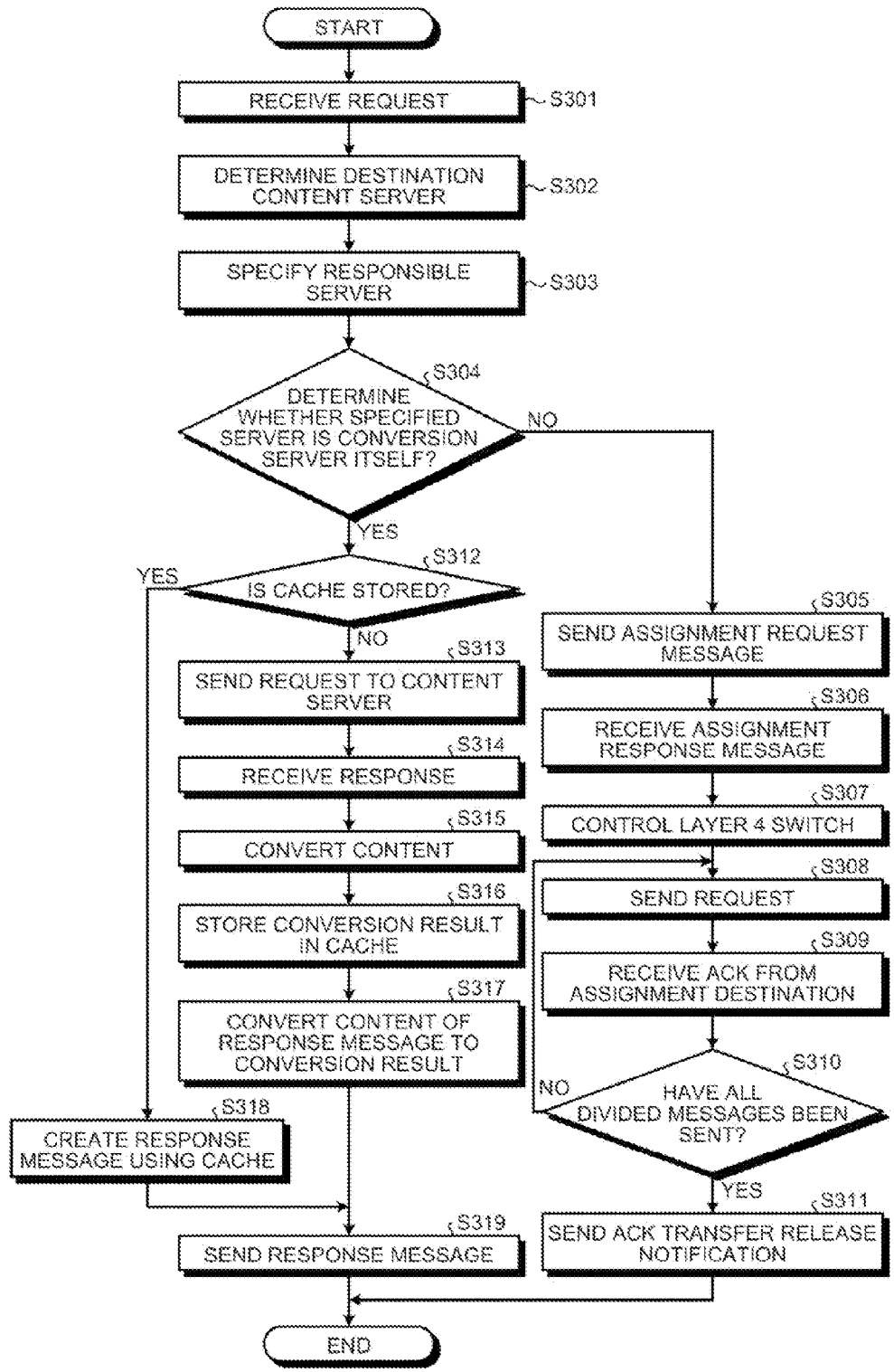
FIG. 24 is a flowchart illustrating the flow of a process performed by the conversion server that has received a request message.

In the following, the flow of a process performed by each device included in the content conversion system will be described with reference to drawings. First, a process performed by the conversion server 22 that has received the request message from the client 15 will be described with reference to FIG. 24. FIG. 24 is a flowchart illustrating the flow of a process performed by the conversion server that has received the request message.

If the conversion server 22 receives the request message from the client 15 (Step S301), the conversion server 22 determines, using the received request message, the destination content server 25 that stores therein content to be requested (Step S302). Furthermore, the conversion server 22 specifies the conversion server 23 that corresponds to the responsible server associated with the combination of the terminal type "CL_A" of the client 15 and the content requested by the client 15 (Step S303).

Then, the conversion server 22 determines whether the specified server is the conversion server 22 (Step S304). If the conversion server 22 determines that the responsible server is not the conversion server 22 (No at Step S304), the conversion server 22 sends an assignment request message to the responsible server (Step S305). Specifically, the conversion server 22 sends the assignment request message to the conversion server 23. Then, the conversion server 22 receives the assignment response message from the conversion server 23 (Step S306). Then, the conversion server 22 sends the connection control message to the layer 4 switch 21 and controls the address conversion table that is stored in the layer 4 switch 21 (Step S307).

The conversion server 22 divides the request message received at Step S301 and sends the divided request message to the destination content server 25 (Step S308). Then, every time the conversion server 22 sends the divided request message, the conversion server 22 receives, via the conversion server 23, the Ack that is sent as a response from the destination content server 25 (Step S309). If the conversion server 22 receives an Ack, the conversion server 22 determines whether all of the divided request messages are sent (Step S310).

If the conversion server 22 determines that not all of the divided request messages are sent (No at Step S310), the conversion server 22 sends the request message that has not been sent to the content server 25 (Step S308). In contrast, if the conversion server 22 determines that all of the divided request messages are sent (Yes at Step S310), the conversion server 22 sends an Ack transfer release notification to the conversion server 23 (Step S311) and completes the process.

Furthermore, if the conversion server 22 determines, at Step S304, that the responsible server is the conversion server 22 (Yes at Step S304), the conversion server 22 determines whether the conversion server 22 stores therein the cache (Step S312). Specifically, the conversion server 22 determines, in accordance with the terminal type of the client 15, whether the conversion server 22 stores therein the cache of the converted content that is requested.

If the conversion server 22 determines that the conversion server 22 does not store therein the cache (No at Step S312), the conversion server 22 sends the request to the content server 25 (Step S313). Then, the conversion server 22 receives a response from the content server 25 (Step S314). Specifically, the conversion server 22 receives content that is requested. Then, the conversion server 22 converts the received content in accordance with the terminal type of the client 15 that is the source of the request message (Step S315).

The conversion server 22 stores the converted content in the cache (Step S316). Then, the conversion server 22 replaces the content of the response message received from the content server 25 with the converted content (Step S317). The conversion server 22 sends the response message to the client 15 that is the source of the request message (Step S319). Then, the conversion server 22 completes the process.

In contrast, if the conversion server 22 determines that the conversion server 22 stores therein the cache (Yes at Step S312), the conversion server 22 creates a response message using the cache (Step S318). Then, the conversion server 22 sends the created response message to the client 15 that is the source of the request message (Step S319) and completes the process.

Figure 25:
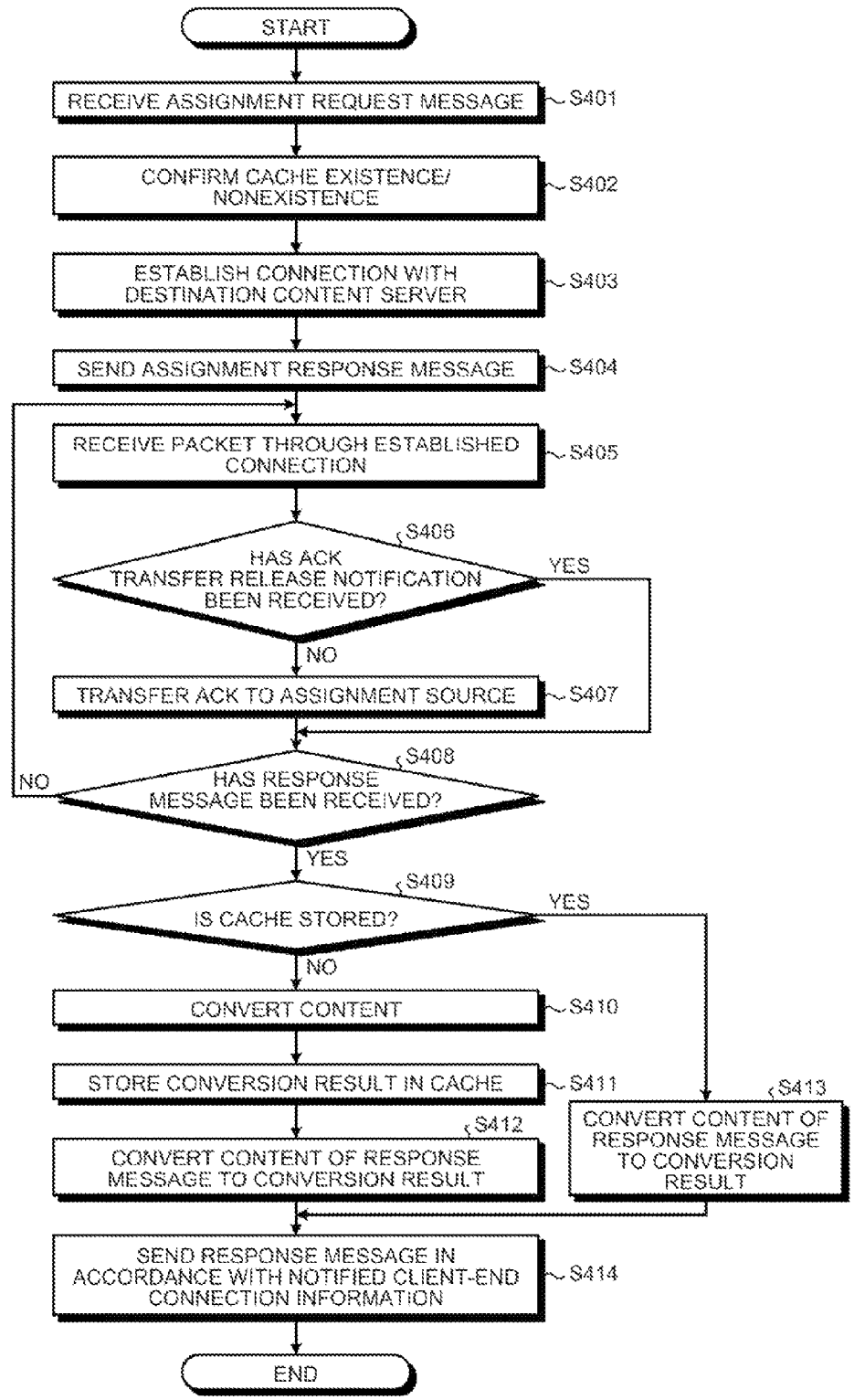
FIG. 25 is a flowchart illustrating the flow of a process performed by the conversion server that has received an assignment request message.

In the following, the flow of a process performed, on the assignment request message received from the conversion server 24, by the conversion server 22 will be described with reference to FIG. 25. FIG. 25 is a flowchart illustrating the flow of the process performed by the conversion server that has received an assignment request message. In the example illustrated in FIG. 25, it is assumed that the conversion server 22 receives the assignment request message sent from the conversion server 24.

If the conversion server 22 receives an assignment request message from the conversion server 24 that is the assignment source (Step S401), the conversion server 22 determines, using the cache ID contained in the assignment request message, whether the conversion server 22 stores therein the cache (Step S402). Then, the conversion server 22 establishes the connection with the destination content server (Step S403). The conversion server 22 creates an assignment response message and sends the created assignment response message to the conversion server 24 (Step S404).

Then, the conversion server 22 receives a packet through the connection established at Step S403 (Step S405). Specifically, the conversion server 22 receives the packet of the response message from the destination content server. If the conversion server 22 receives the packet from the destination content server, the conversion server 22 determines whether an Ack transfer release notification is received from the conversion server 24 (Step S406).

If the conversion server 22 determines that the conversion server 22 has not received the Ack transfer release notification from the conversion server 24 (No at Step S406), the conversion server 22 sends, to the conversion server 24 that is the assignment source, the Ack received from the destination content server (Step S407). In contrast, if the conversion server 22 determines that the conversion server 22 has received the Ack transfer release notification from the conversion server (Yes at Step S406), the conversion server 22 performs the subsequent process without sending the Ack.

Then, the conversion server 22 determines whether the receiving of the response message has been completed (Step S408). If the conversion server 22 determines that the receiving of the response message has not been completed (No at Step S408), the conversion server 22 continues the receiving of the response message (Step S405). In contrast, if the conversion server 22 determines that the receiving of the response message has been completed (Yes at Step S408), the conversion server 22 determines whether the cache confirmed at Step S402 is stored in the conversion server 22 (Step S409).

If the conversion server 22 determines that the cache is not stored in the conversion server 22 (No at Step S409), the conversion server 22 converts, in accordance with the client type, the content contained in the response message (Step S410). Then, the conversion server 22 stores therein the conversion result in the cache (Step S411). The conversion server 22 replaces the content of the response message with the conversion result (Step S412). Then, the conversion server 22 sends the response message to the client in accordance with the client-end connection information that is notified by the assignment request message (Step S414).

In contrast, if the conversion server 22 determines that the cache is stored in the conversion server 22 (Yes at Step S409), the conversion server 22 replaces, with the cache, the content of the response message that is received from the destination content server (Step S413). Then, the conversion server 22 sends the response message to the client in accordance with the client-end connection information notified by the assignment request message (Step S414).

Figure 26:
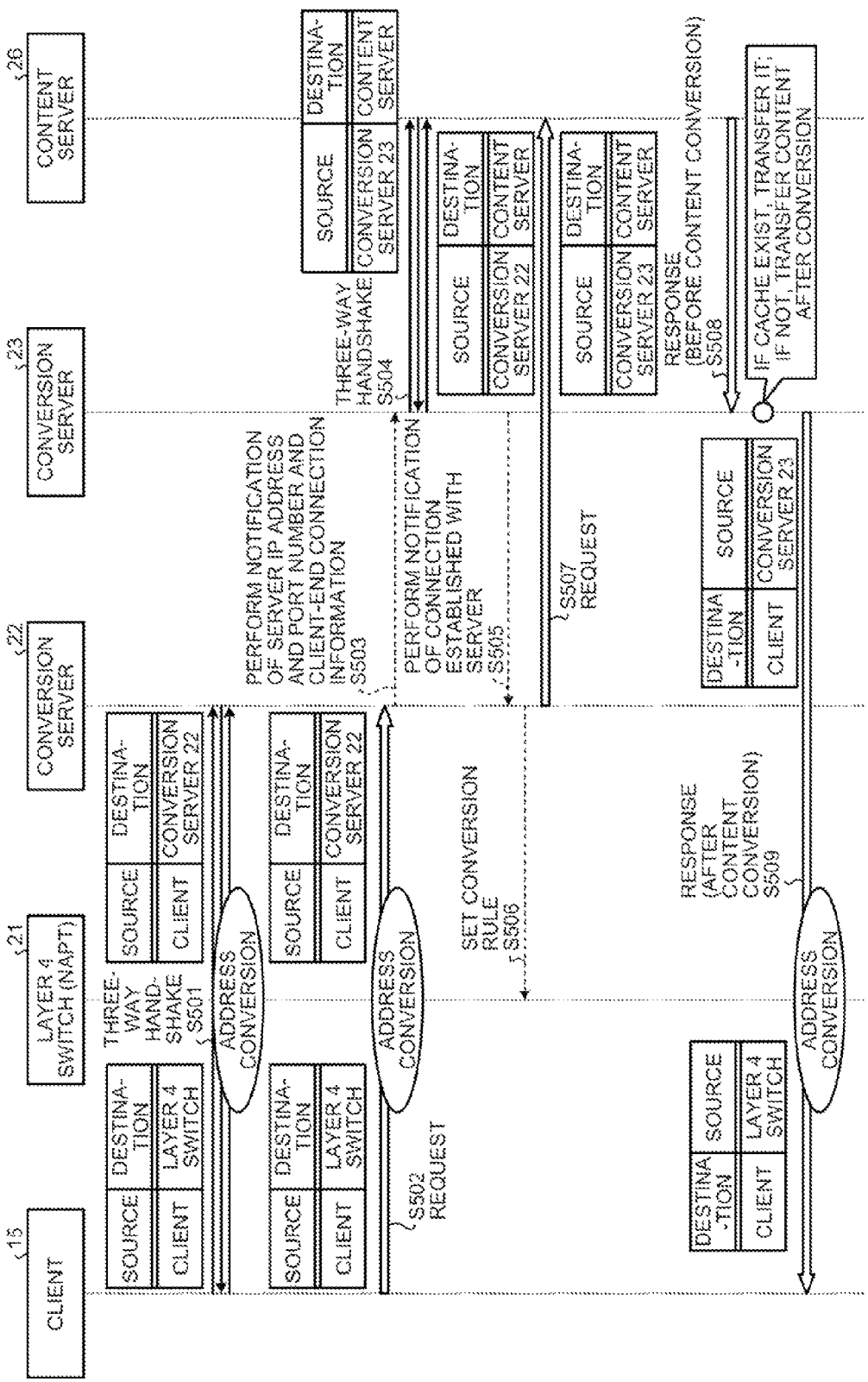
FIG. 26 is a sequence diagram (1) illustrating the flow of a process performed by each device.

In the following, the flow of a process performed by each device will be described with reference to FIG. 26. FIG. 26 is a sequence diagram (1) illustrating the flow of a process performed by each device. First, the client 15 and the conversion server 22 perform, via the layer 4 switch 21, a three-way handshake and establish the connection (Step S501). Then, the client 15 sends, using the established connection, a request message to the conversion server 22 (Step S502). The conversion server 22 sends, to the conversion server 23, the IP address and port number of the destination content server that stores therein the content that is requested and client-end connection information (Step S503).

Then, by using the IP address and port number of the notified destination content server, the conversion server 23 establishes the connection with the content server 26 (Step S504). The conversion server 23 notifies the conversion server 22 of the information on the connection established with the content server 26 (Step S505).

The conversion server 22 send, to the layer 4 switch, a connection control message and sets a conversion rule for the TCP/IP header (Step S506). Furthermore, the conversion server 22 sends, to the content server 26 using the connection established between the conversion server 23 and the content server 26, a request message (Step S507). If the content server 26 receives the request message (Step S508), the content server 26 sends a response to the conversion server 23 (Step S509).

After receiving the response, the conversion server 23 determines whether the conversion server 23 stores therein the cache. If the conversion server 23 stores therein the cache, the conversion server 23 replaces the content contained in the response with the cache. In contrast, if the conversion server 23 determines that the conversion server 23 stores therein the cache, the conversion server 23 converts the content contained in the response. Then, the conversion server 23 sends the response to the client 15. Specifically, the conversion server 23 sends, to the client 15, the response containing the content that is converted in accordance with the terminal type of the client 15.

Figure 27:
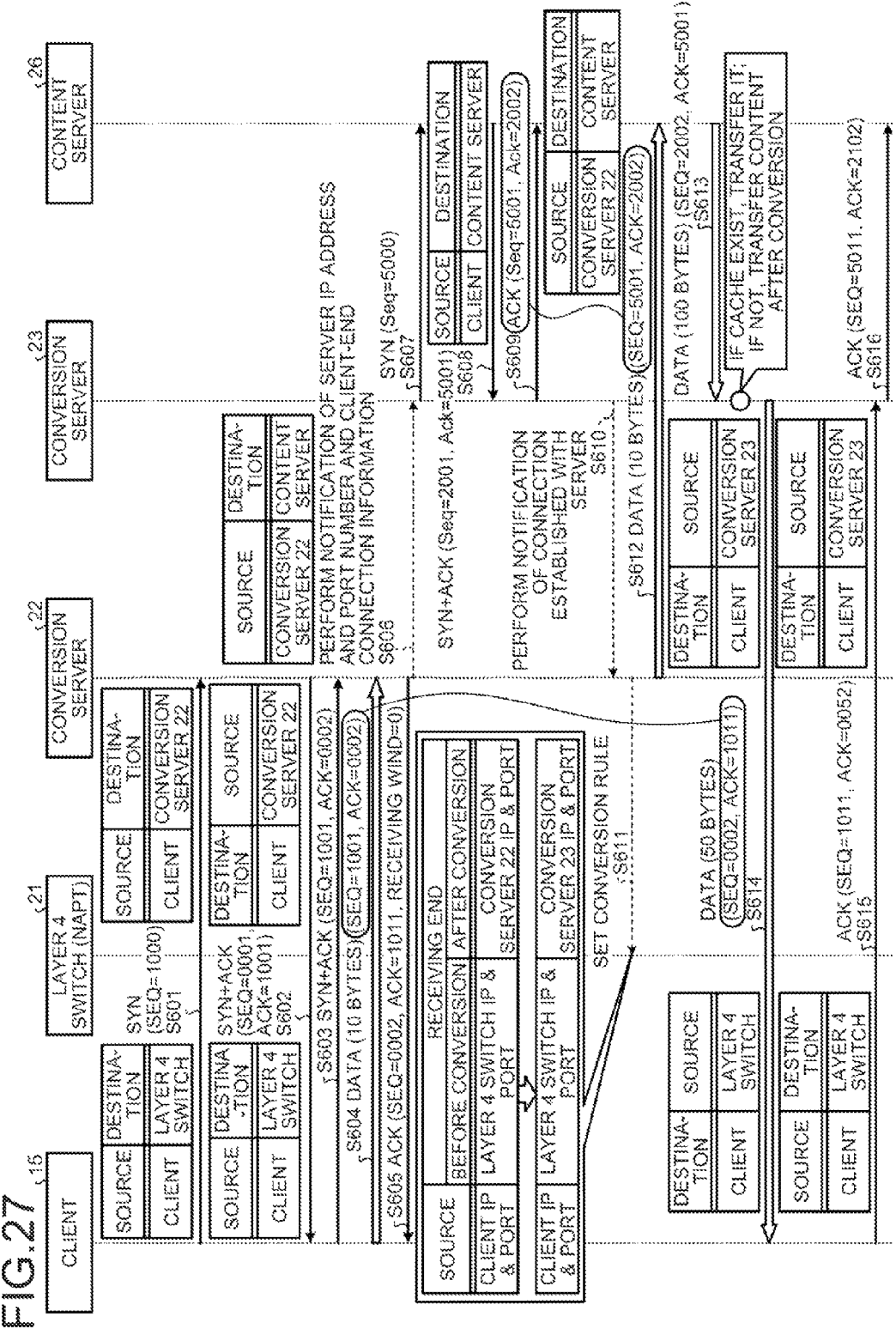
FIG. 27 is a sequence diagram (2) illustrating the flow of a process performed by each device.

The assignment source conversion server 22 and the assignment destination conversion server 23 communicate with each other using connection information that contains both a sequence number and a confirmation response number. Accordingly, as illustrated in FIG. 27, each conversion server can perform a conversion process on content without a conflict between a sequence number and a confirmation response number. As a result, the conversion server 22 and the conversion server 23 can provide a processing performance that is proportional to the number of conversion servers while guaranteeing a cache hit without arranging additional units for the client 15 and the content server 26. FIG. 27 is a sequence diagram (2) illustrating the flow of the process performed by each device.

Figure 28:
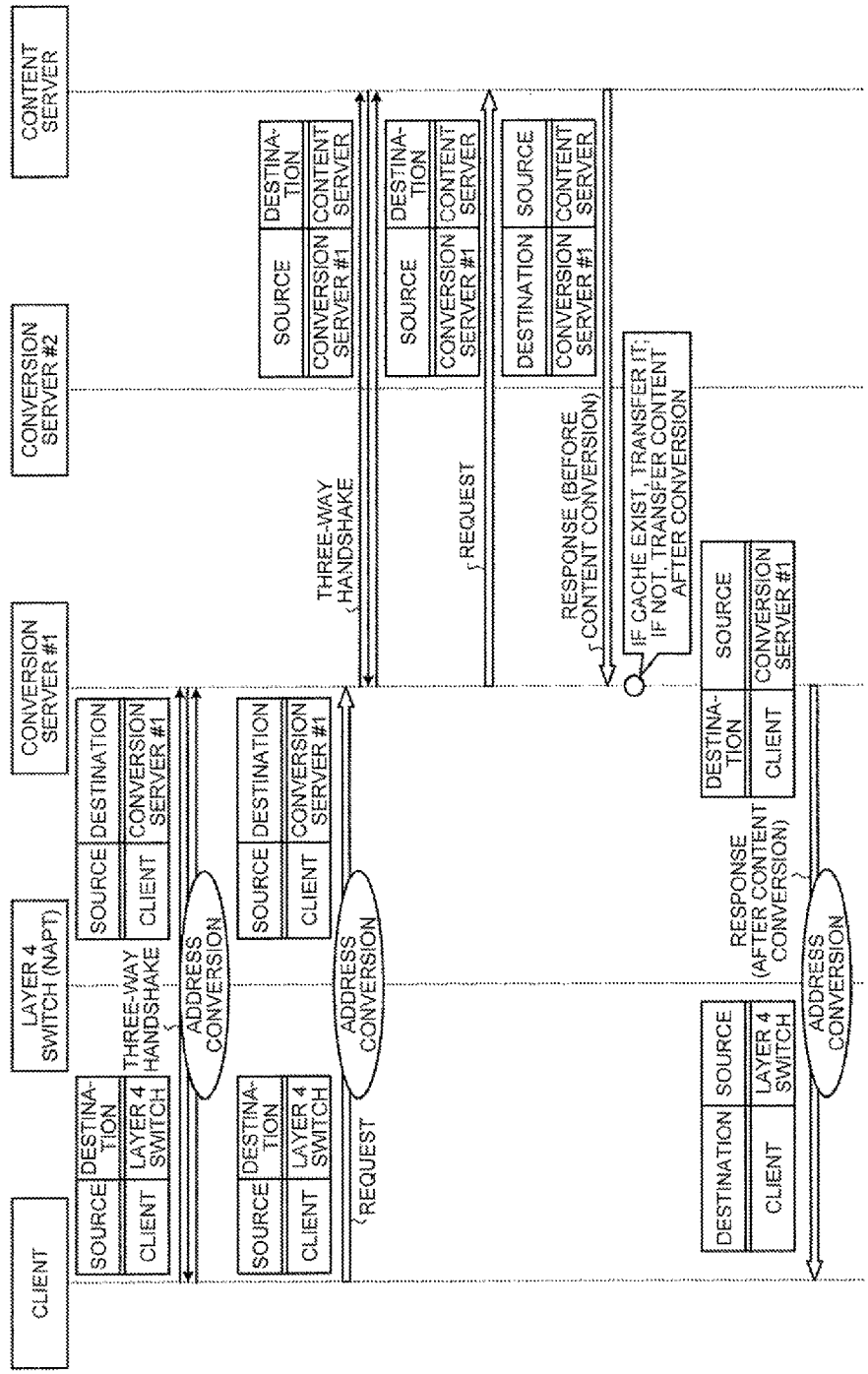
FIG. 28 is a sequence diagram illustrating the flow of a conventional process.

FIG. 28 is a sequence diagram illustrating the flow of a conventional process. In the example illustrated in FIG. 28, if a conversion server #1 receives a request message from a client, the conversion server #1 requests content from a content server. Then, the conversion server #1 converts the acquired content and sends the converted content to the client.

After such a process has been performed, if the same request message is assigned to the conversion server #2, the conversion server #2 requests the content and performs the conversion process even though an appropriate cache exists in the conversion server #1. In other words, the conversion server #1 and the conversion server #2 cannot appropriately use the cache.

In contrast, each of the conversion servers 22 to 24 according to the second embodiment is associated, in advance, with a combination of the content and the terminal type. If each of the conversion servers 22 to 24 receives a request message, each of the conversion servers 22 to 24 assigns a process to a conversion server that is associated with a combination of the terminal type of the client that corresponds to the source of the request message and the content requested to be sent. Accordingly, each conversion server can guarantee a cache hit without synchronizing the cache in each of the conversion servers 22 to 24. As a result, each of the conversion servers 22 to 24 can provide a processing performance that is proportional to the number of conversion servers.

Advantage of Second Embodiment

As described above, the conversion server 22 stores therein, in an associated manner, a combination of information indicating content and information indicating a terminal type and server information uniquely indicating a conversion server. If the conversion server 22 receives a request message, the conversion server 22 analyzes the received request message and distinguishes between type information indicating the type of the client that has sent the request message and content information indicating the content requested to be sent. Then, the conversion server 22 specifies the server information that is associated with the distinguished combination of the type information and the content information. Specifically, the conversion server 22 specifies a conversion server that performs the conversion process. Then, the conversion server 22 sends an assignment request message to the conversion server indicated by the specified server information.

Specifically, when the conversion server 22 distributes the conversion process, if a cache that corresponds to the execution result of the conversion process is stored in any one of the conversion servers, the conversion server 22 distributes the conversion process to the conversion server that stores therein the cache corresponding to the execution result. Accordingly, if the conversion server 22 receives the same request message, the conversion server 22 can allow the same conversion server to perform the conversion process. As a result, the conversion server 22 can appropriately use the cache stored in each of the conversion servers 22 to 24.

Furthermore, if an appropriate cache exists in any one of the conversion servers 22 to 24, the conversion server 22 can always guarantee a cache hit without synchronizing the cache with the other conversion servers 23 to 24. As a result, the conversion server 22 can appropriately use the cache stored in each of the conversion servers 22 to 24 without increasing processing loads.

Furthermore, if the conversion server 22 receives a request message that requests the sending of content from the client 15, the conversion server 22 determines the User-Agent and the Request-URI contained in the received request message. Accordingly, the conversion server 22 determines the terminal type of the client 15 and the content that is requested by the client 15 without allowing the client 15 to perform another process.

Furthermore, the conversion server 22 establishes a connection with the content server 26 and sends, to the conversion server 24, server-end connection information that is information on the established connection. Furthermore, if the conversion server 22 receives server-end connection information from the conversion server 23, the conversion server 22 sends, using the received server-end connection information, the request message to the content server 25.

Accordingly, the conversion server 22 can send the request message to the content server 25 while maintaining the connection between the conversion server 23 and the content server 25. Furthermore, the conversion server 22 can allow the conversion server 24 to send the request message to the content server 26 while maintaining the connection with the content server 26. As a result, an advantage is provided in that there is no need for the conversion server 22 to allow each of the clients 15 to 17 and each of the content servers 25 to 27 to perform another process.

Furthermore, the conversion server 22 notifies the conversion server 23 of client-end connection information indicating the connection established with the client 15. Furthermore, the conversion server 22 is notified by the conversion server 24 of client-end connection information indicating the connection established between the client 16 and the conversion server 24.

Accordingly, the conversion server 22 can allow the conversion server 23 to send the converted content to the client 15 using the connection that is established between the conversion server 22 and the client 15. Furthermore, by using the connection established between the conversion server 24 and the client 16, the conversion server 22 can send the converted content to the client 16. As a result, an advantage is provided in that there is no need for the conversion server 22 to allow each of the clients 15 to 17 to perform another process.

[c] Third Embodiment

In the second embodiment described above, the conversion server 22 acquires content from a content server even when converted content is stored in a cache; however the embodiment is not limited thereto. For example, if converted content is stored in a cache, it is possible to skip acquiring content. Accordingly, in an embodiment described below, a case in which a content conversion system that skips, if converted content is stored in a cache, the acquiring of content will be described. In the following description, components having the same function as those included in the conversion servers 22 to 24 according to the second embodiment are assigned the same reference numerals; therefore, a description thereof is omitted.

Figure 29:
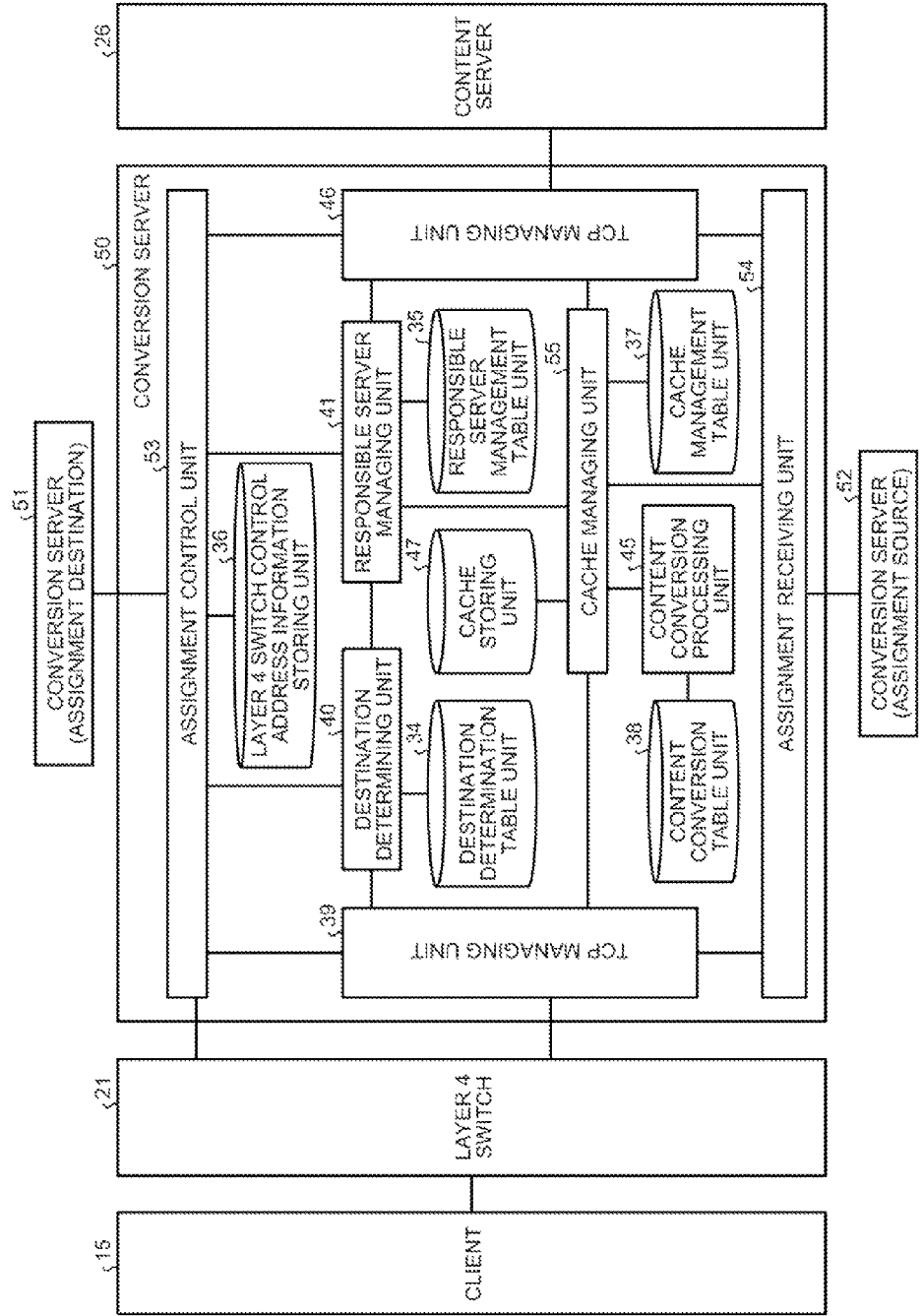
FIG. 29 is a schematic diagram illustrating a conversion server according to a third embodiment.

First, a conversion server 50 according to a third embodiment will be described with reference to FIG. 29. FIG. 29 is a schematic diagram illustrating the conversion server according to the third embodiment. In the example illustrated in FIG. 29, the conversion server 50 includes the destination determination table unit 34, the responsible server management table unit 35, the layer 4 switch control address information storing unit 36, the cache management table unit 37, the content conversion table unit 38, and the cache storing unit 47. Furthermore, the conversion server 50 includes the TCP managing unit 39, the destination determining unit 40, the responsible server managing unit 41, an assignment control unit 53, an assignment receiving unit 54, a cache managing unit 55, the content conversion processing unit 45, and the TCP managing unit 46.

Furthermore, in the following description, it is assumed that conversion servers 51 and 52 have the same configuration as the conversion server 50; therefore, a description thereof is omitted. It is assumed that the destination determination table unit 34, the responsible server management table unit 35, the layer 4 switch control address information storing unit 36, the cache management table unit 37, and the content conversion table unit 38 store therein the same information as that stored in the components according to the second embodiment; therefore, a description thereof is omitted. It is assumed that the TCP managing unit 39, the destination determining unit 40, the responsible server managing unit 41, the content conversion processing unit 45, the TCP managing unit 46, and the cache storing unit 47 have the same function as those described in the second embodiment; therefore, a description thereof is omitted.

The assignment control unit 53 has the same function as the assignment control unit 42 according to the second embodiment. If an appropriate cache exists in an assignment-destination conversion server, the assignment control unit 53 sends, to an assignment-destination conversion server, a request message received from a client. Specifically, the assignment control unit 53 receives an assignment response message from the assignment destination conversion server 51.

Figure 30:
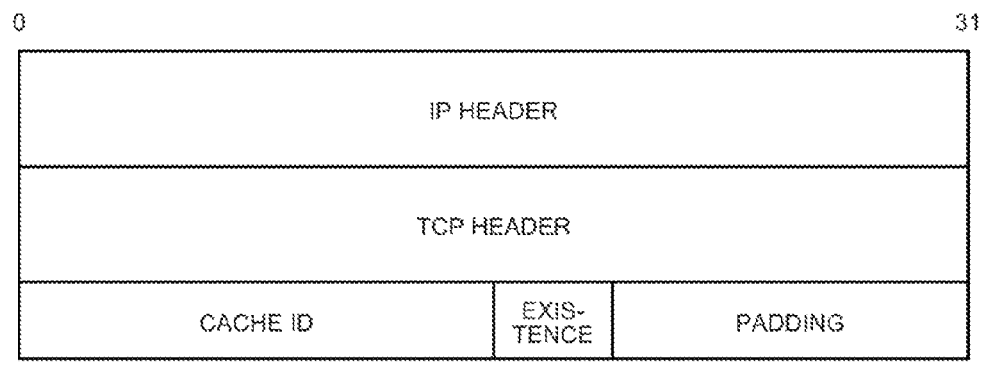
FIG. 30 is a schematic diagram illustrating an example of an assignment response message when an appropriate cache exists.

As illustrated in FIG. 30, if the assignment destination conversion server 51 determines that the assignment destination conversion server 51 stores therein a cache, the assignment destination conversion server 51 creates an assignment response message that includes an IP header and a TCP header containing the IP address and the port number, respectively, of the conversion server 50. Furthermore, the assignment destination conversion server 51 stores therein a cache ID, information indicating cache existence/nonexistence, and "padding". The "padding" illustrated in FIG. 30 is a stuffing byte that is used to keep the size of assignment response message constant. FIG. 30 is a schematic diagram illustrating an example of the assignment response message when an appropriate cache exists.

Figure 31:
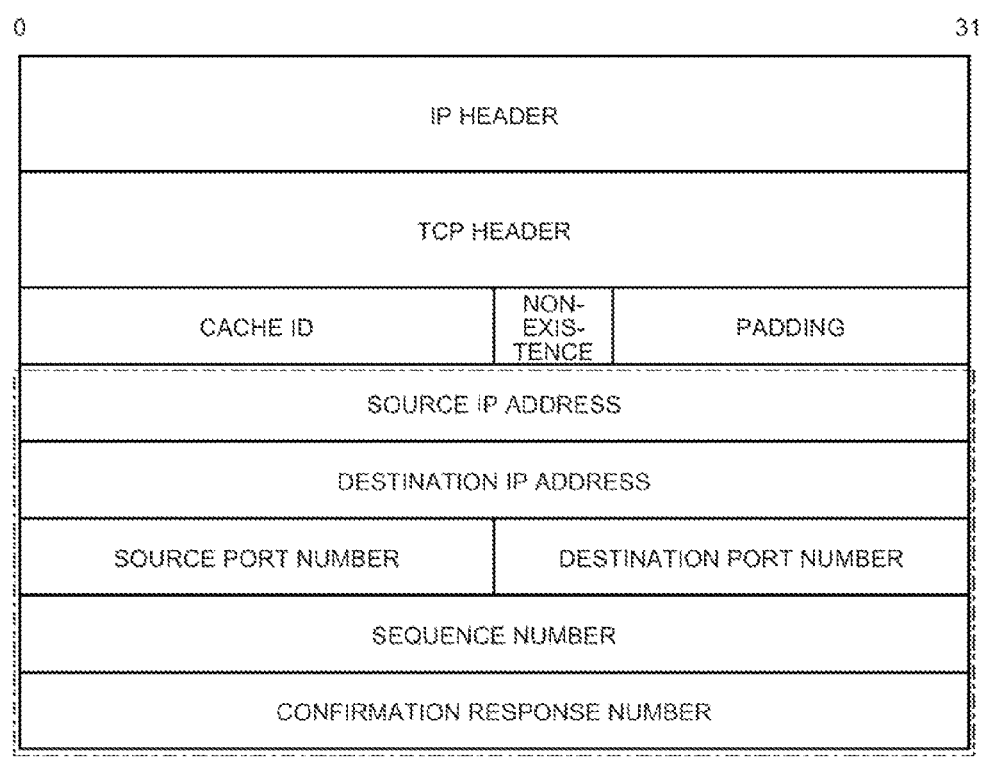
FIG. 31 is a schematic diagram illustrating an example of an assignment response message when an appropriate cache does not exist.

As illustrated in FIG. 31, if the assignment destination conversion server 51 determines that the assignment destination conversion server 51 does not store therein a cache, the assignment destination conversion server 51 stores, in the assignment response message, the same information as the server-end connection information according to the second embodiment. FIG. 31 is a schematic diagram illustrating an example of an assignment response message when an appropriate cache does not exist.

Referring back to FIG. 29, the assignment control unit 53 analyzes the received assignment response message and determines whether an assignment destination conversion server stores therein the cache. Then, if the assignment control unit 53 determines that the assignment destination conversion server stores therein the cache, the assignment control unit 53 transfers, to the assignment destination server, the request message that is sent from the client. In contrast, if the assignment control unit 53 determines that the assignment destination server does not store therein the cache, in a similar manner as performed by the assignment control unit 42 according to the second embodiment, the assignment control unit 53 acquires the server-end connection information from the received assignment response message.

The assignment receiving unit 54 has the same function as that performed by the assignment receiving unit 43 according to the second embodiment. Furthermore, if the assignment receiving unit 54 determines that the cache indicated by the searched cache ID is stored, the assignment receiving unit 54 creates an assignment response message that contains the searched cache ID and the existence/nonexistence of the cache. Then, the assignment receiving unit 54 sends the created assignment response message to the assignment source conversion server.

Furthermore, the assignment receiving unit 54 receives, from an assignment source server, the request message that is sent from the client. Then, the assignment receiving unit 54 sends the received request message to the cache managing unit 55.

In contrast, if the assignment receiving unit 54 determines that the cache indicated by the searched cache ID searched by the cache managing unit 55 is not stored, the assignment receiving unit 54 creates, in a similar manner as that performed by the assignment receiving unit 43 according to the second embodiment, a request message for content and sends the created request message to the content server 26.

The cache managing unit 55 has the same function as the cache managing unit 44 according to the second embodiment. Furthermore, if the cache managing unit 55 receives, from the assignment receiving unit 54, the request message sent from the client, the cache managing unit 55 creates a response message using the received request message and the cache. Then, the cache managing unit 55 sends the created response message to the client via the TCP managing unit 39.

Figure 32:
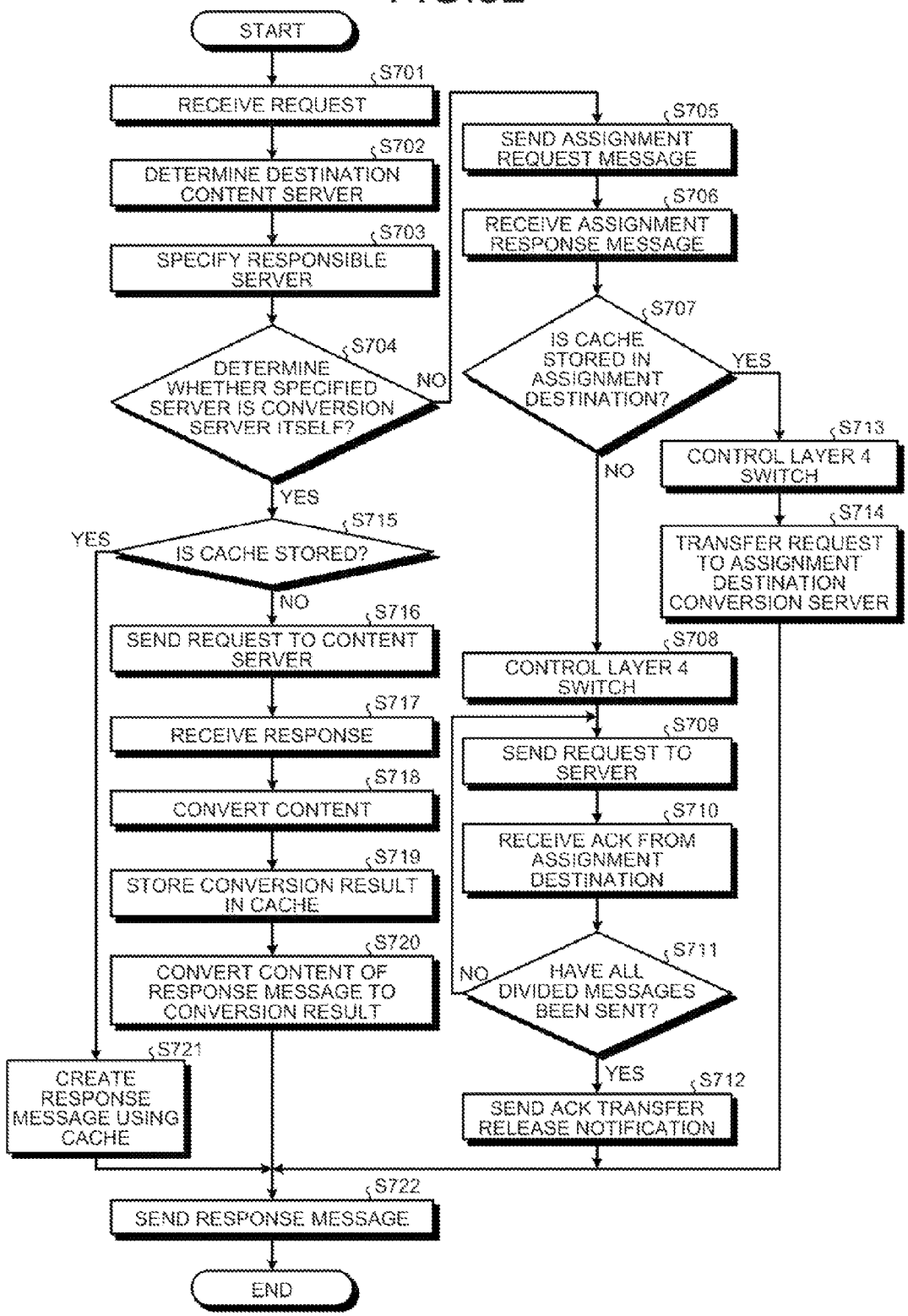
FIG. 32 is a flowchart illustrating the flow of a process performed by the conversion server that has received a request message.

In the following, the flow of a process performed by the conversion server 50 that has received a request message from the client will be described with reference to FIG. 32. FIG. 32 is a flowchart illustrating the flow of a process performed by the conversion server that has received the request message.

From among the processes illustrated in FIG. 32, processes performed at Steps S701 to S706, S708 to S712, and S715 to S722 are the same as those performed at Steps S301 to S306, S307 to S311, and S312 to S319 illustrated in FIG. 24; therefore, a description thereof is omitted. In the following description, it is assumed that the conversion server 50 receives a request message that is sent from the client 15 and sends an assignment request message to the conversion server 51.

When the conversion server 50 receives an assignment response message from the conversion server 51, by using the received assignment response message, the conversion server 50 determines whether an appropriate cache is stored in the assignment destination conversion server 51 (Step S707). Then, if the conversion server 50 determines that the cache is stored in the assignment destination conversion server 51 (Yes at Step S707), the conversion server 50 controls the layer 4 switch (Step S713). Furthermore, if the conversion server 50 controls the layer 4 switch, the conversion server 50 sends, to the assignment destination conversion server 51, the request message that is sent from the client 15 (Step S714).

Figure 33:
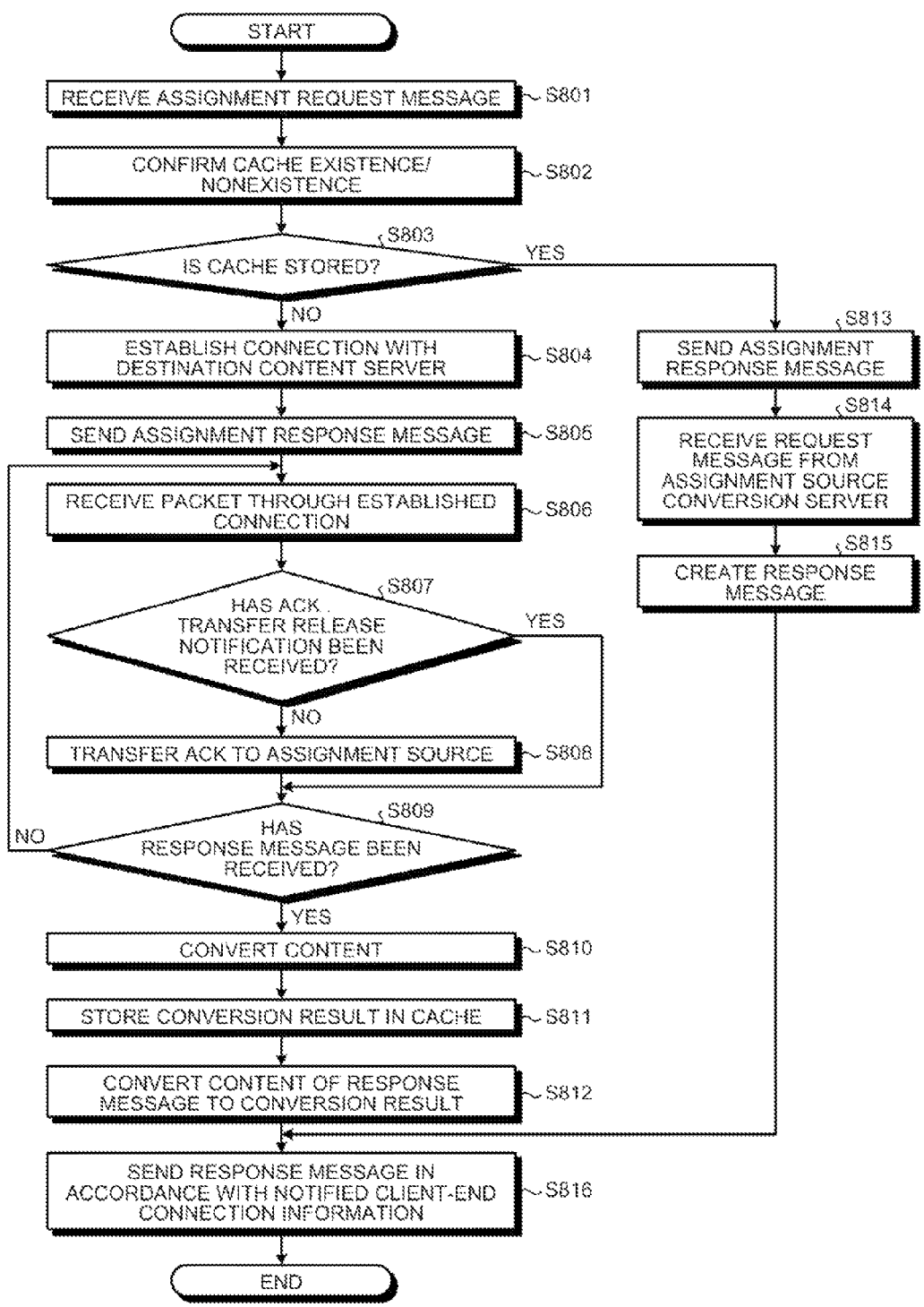
FIG. 33 is a flowchart illustrating the flow of a process performed by the conversion server that has received an assignment request message.

In the following, the flow of a process performed by the conversion server 50 that has received an assignment request message will be described with reference to FIG. 33. FIG. 33 is a flowchart illustrating the flow of a process performed by the conversion server that has received the assignment request message. In the following description, it is assumed that the conversion server 50 receives the assignment request message from the conversion server 52.

In the example illustrated in FIG. 33, the conversion server 50 starts a process triggered when the assignment request message is received from the assignment source conversion server 52. It is assumed that the assignment source conversion server 52 receives the request message that is sent from the client 17.

From among the processes illustrated in FIG. 33, the processes performed at Steps S801 to S802, S804 to S812, and S816 are the same as those performed at Steps S401 to S402, S403 to S412, and S414 illustrated in FIG. 25; therefore, a description thereof will be omitted.

If the conversion server 50 determines that the conversion server 50 stores therein the cache confirmed at Step S802 (Yes at Step S803), the conversion server 50 sends the assignment response message to the conversion server 52 (Step S813). Then, the conversion server 50 receives, from the assignment source conversion server 52, the request message that is sent from the client 17 (Step S814).

The conversion server 50 creates a response message using the received request message and the cache (Step S815). Then, the conversion server 50 sends the created response message to the client 17 (Step S816).

Figure 34:
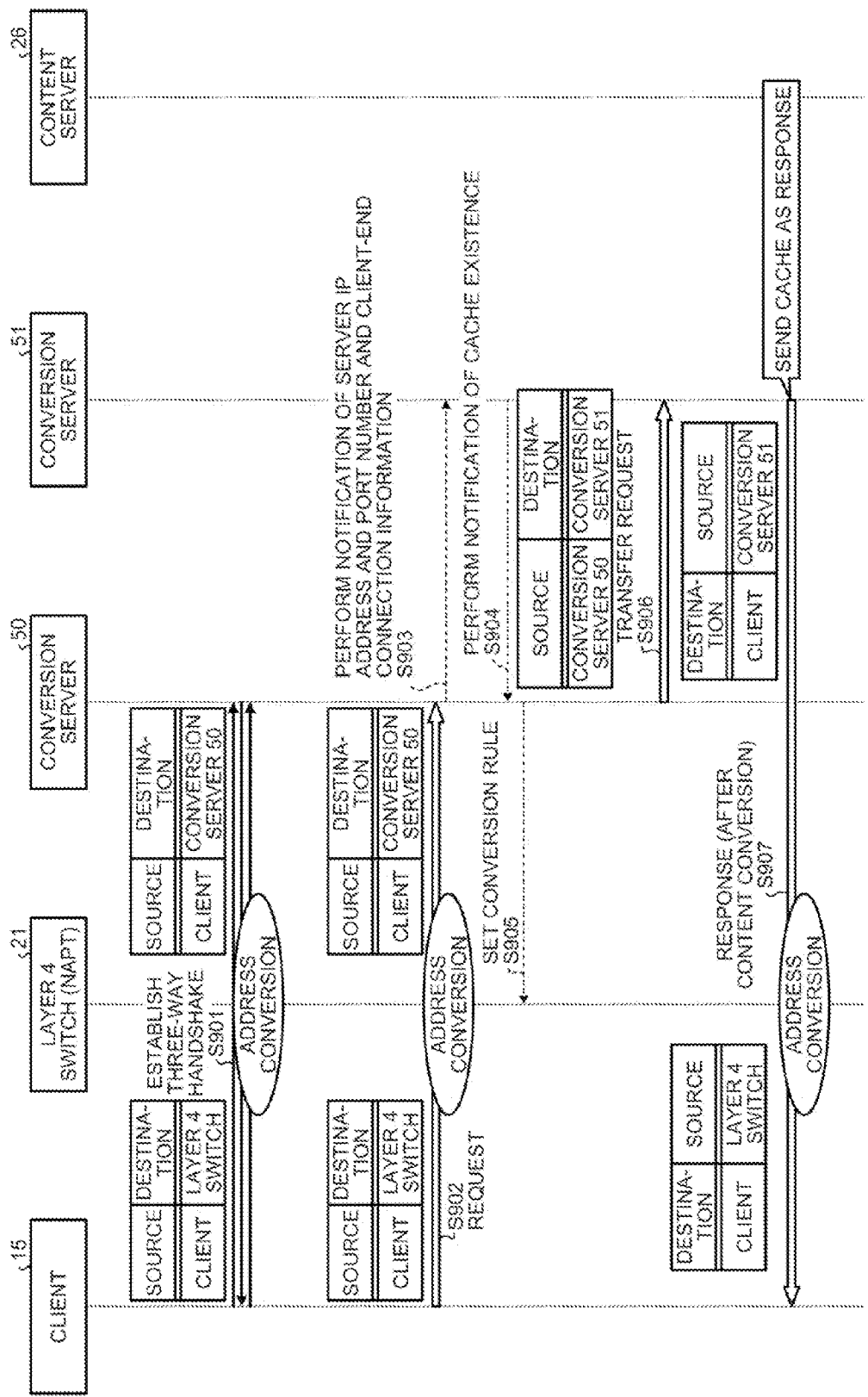
FIG. 34 is a sequence diagram illustrating an example of a process performed by a content conversion system according to the third embodiment.

In the following, the flow of a process performed by each device will be described with reference to FIG. 34. FIG. 34 is a sequence diagram illustrating an example of a process performed by a content conversion system according to the third embodiment. From among the processes illustrated in FIG. 34, the processes performed at Steps S901 to S903 are the same as those performed at Steps S501 to S503 illustrated in FIG. 26; therefore, a description thereof will be omitted.

If the conversion server 51 determines that the conversion server 51 stores therein the cache indicated by the cache ID contained in the assignment request message, the conversion server 51 sends, to the conversion server 50, an assignment response message notifying that the cache is stored in the conversion server 51 (Step S904). If the conversion server 50 acquires, from the conversion server 51, the assignment response message notifying that the cache is stored in the conversion server 51, the conversion server 50 sends a connection control message to the layer 4 switch and sets a conversion rule for the TCP/IP header (Step S905).

Furthermore, the conversion server 50 transfers, to the conversion server 51, the request message that is sent from the client 15 (Step S906). Then, the conversion server 51 creates a response message using both the request message acquired from the conversion server 51 at Step S906 and the cache stored in the conversion server 51. Then, the conversion server 51 sends the created response message to the client 15 (Step S907).

Advantage of Third Embodiment

As described above, if the cache exists in the assignment destination conversion server 51, the conversion server 50 according to the third embodiment transfers, to the assignment destination conversion server 51, the request message that is sent from the client 15. If the cache exists in the assignment destination conversion server 51, the assignment destination conversion server 51 does not establish the connection with the content server 25 and sends the cache to the client 15.

Accordingly, with the conversion server 50 according to the third embodiment, it is possible to further reduce processing loads for sending and receiving information between the conversion servers 50 to 52 and the content servers 25 to 27.

[d] Fourth Embodiment

The embodiments of the present invention have been described; however, the present invention is not limited to the embodiments described above and can be implemented with various kinds of embodiments other than the embodiments described above. Accordingly, another embodiment included in the present invention will be described as a fourth embodiment.

(1) The Number of Conversion Servers

In the second and third embodiments described above, a conversion server that has three conversion servers has been described; however, the embodiments are not limited thereto, so long as a plurality of conversion servers is used. Furthermore, the number of clients and content servers is not limited.

(2) Configuration of the Conversion Server

In the second and third embodiments described above, a conversion server that has a plurality of storing units 34 to 38 and 47 has been described; however, the embodiments are not limited thereto. For example, the conversion server can have a single storing unit having the function of each of the storing units 34 to 38 and 47. Furthermore, in the second and third embodiments, the conversion server includes the different TCP managing units 39 and 46 arranged on the client side and the content side, respectively; however, the embodiments are not limited thereto. A single TCP managing unit can be shared by the client side and the content side.

(3) Program

Figure 35:
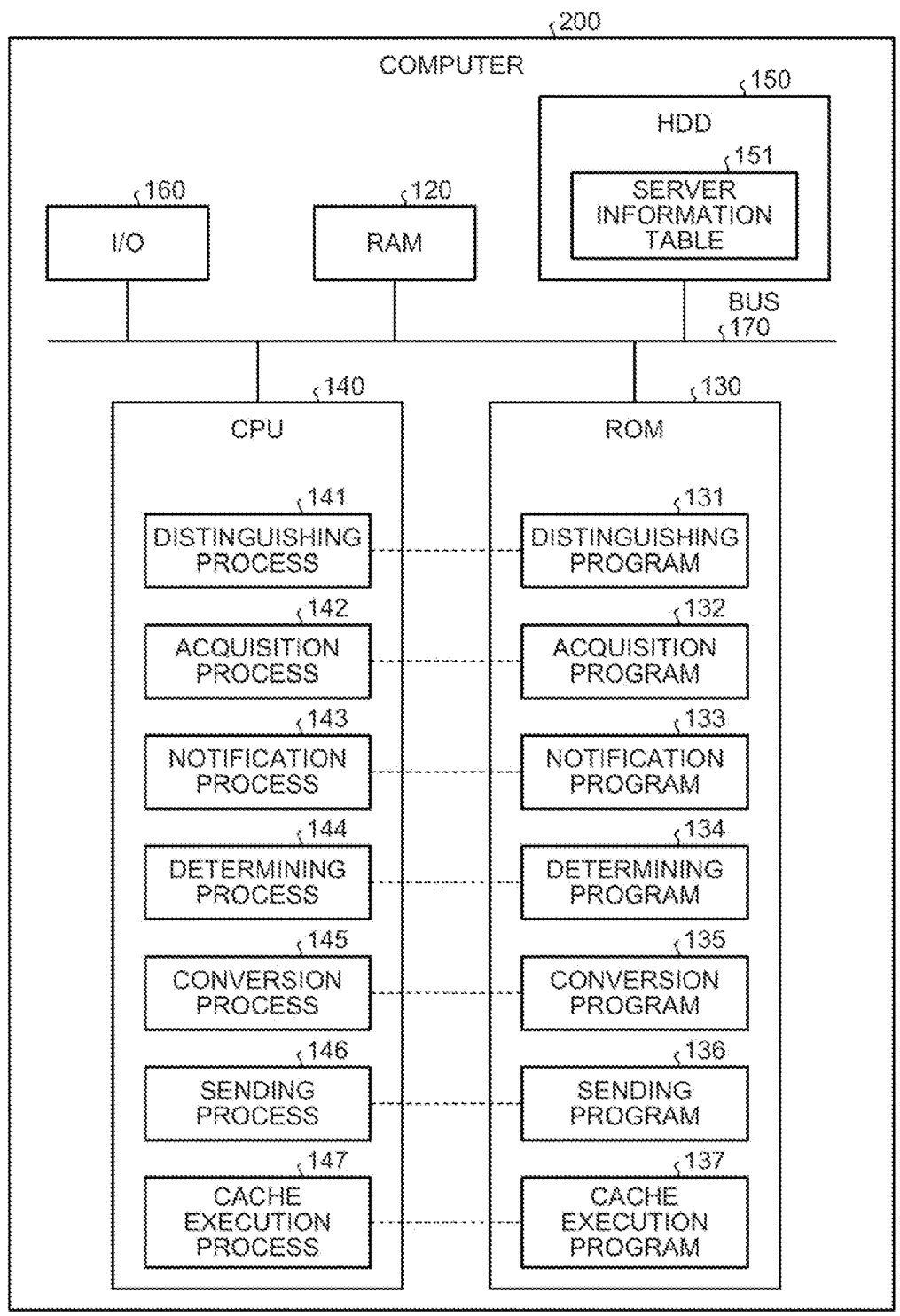
FIG. 35 is a block diagram illustrating an example of a computer that executes a conversion program.
Figure 36:
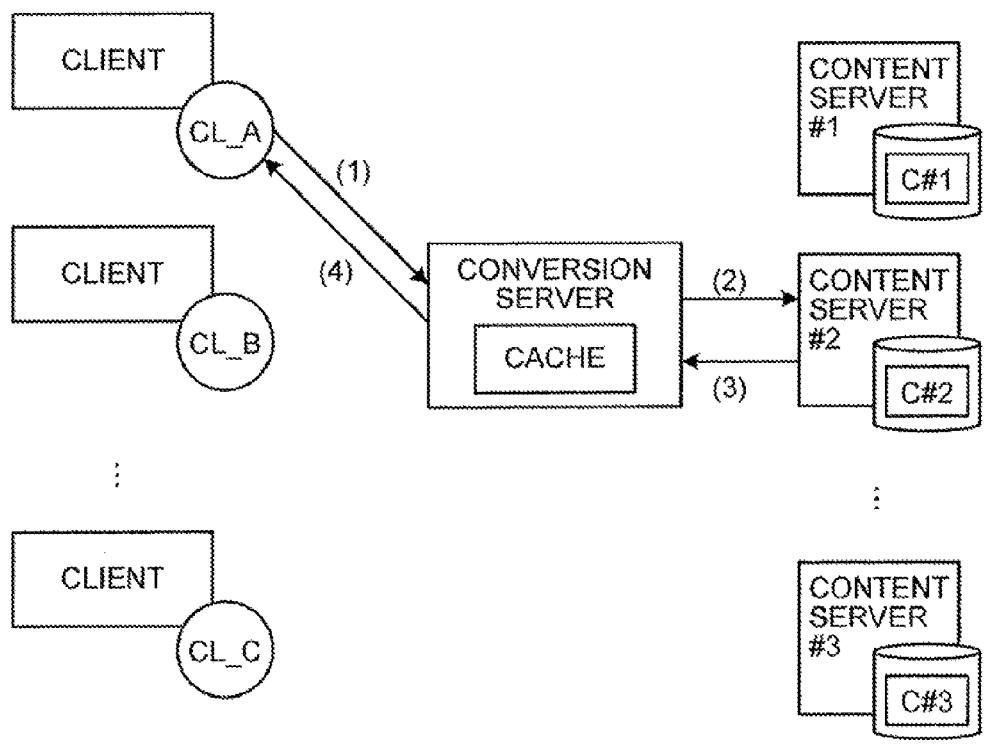
FIG. 36 is a schematic diagram illustrating a conventional content conversion system.
Figure 37:
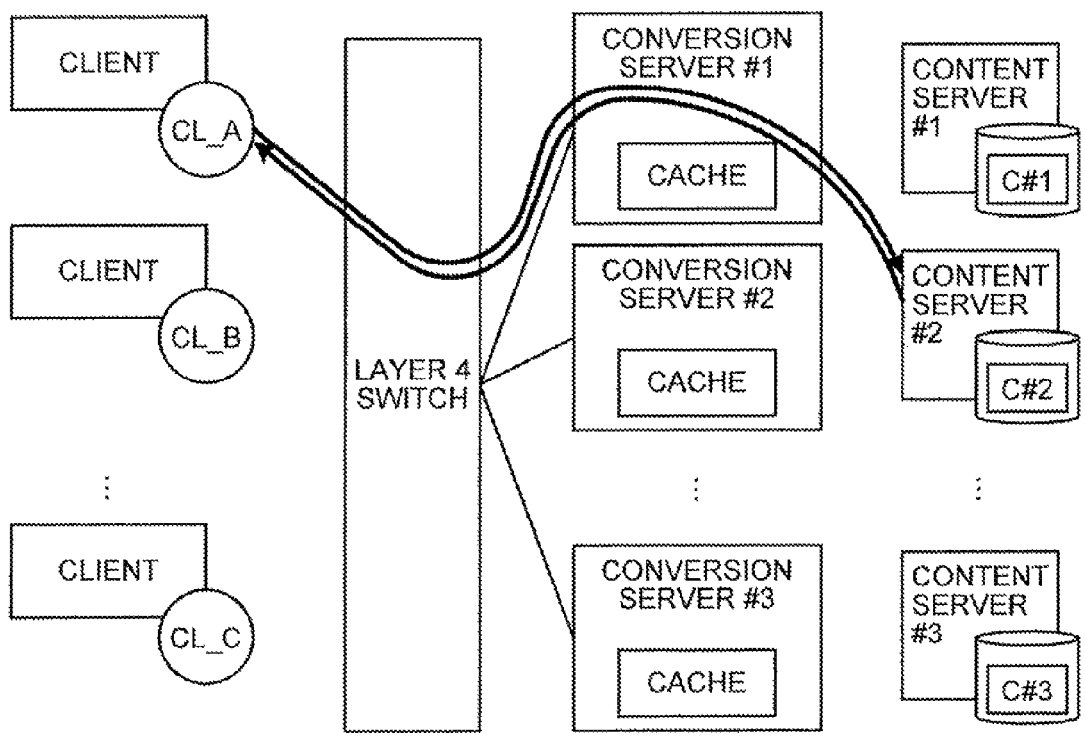
FIG. 37 is a schematic diagram illustrating conventional scale-out architecture.
Figure 38:
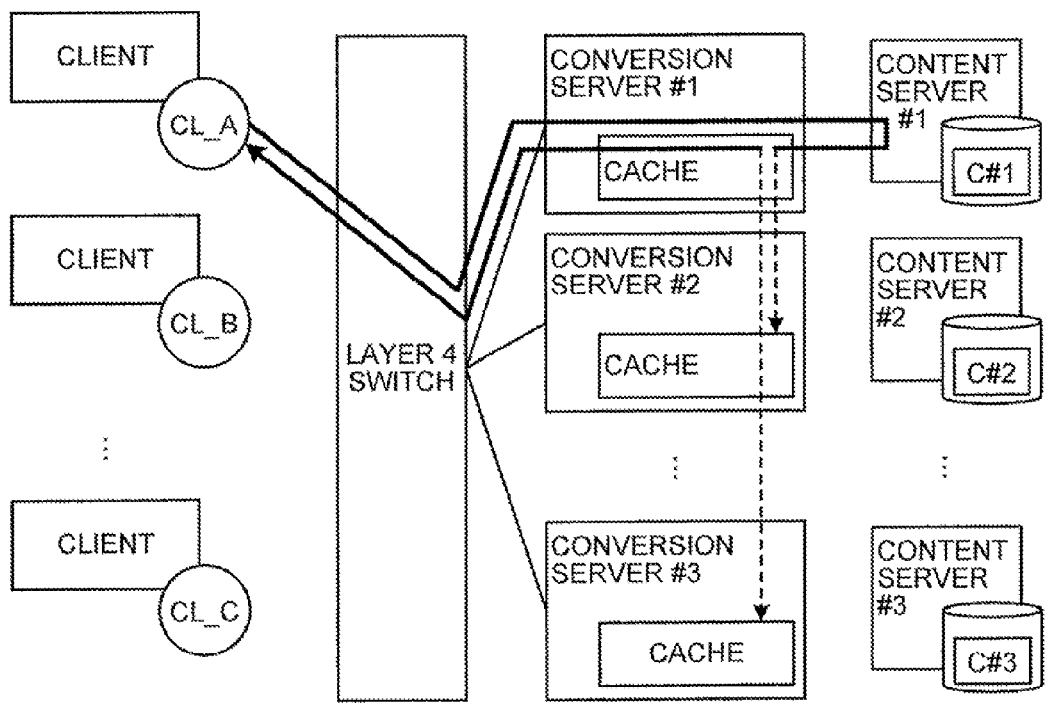
FIG. 38 is a schematic diagram illustrating the conventional flow of data.

With the conversion network according to the first embodiment and the conversion server according to the second and third embodiments, a case in which various processes are implemented using hardware has been described; however, the embodiments are not limited thereto. For example, it is possible to implement programs prepared in advance and executed by computers. Accordingly, in the following, a computer that execute programs having the same function as those performed by the conversion server described in the first embodiment will be described as an example with reference to FIG. 35. FIG. 35 is a block diagram illustrating an example of a computer that executes a conversion program.

In a computer 200 illustrated in FIG. 35, a random access memory (RAM) 120, a read only memory (ROM) 130, and a hard disk drive (HDD) 150 are connected via a bus 170. Furthermore, a central processing unit (CPU) 140 is also connected via the bus 170. Furthermore, an input/output (I/O) 160 that sends and receives information is also connected to the bus 170.

The HDD 150 stores therein a server information table 151. The ROM 130 stores therein, in advance, a distinguishing program 131, an acquisition program 132, and a notification program 133. Furthermore, the ROM 130 stores therein, in advance, a determining program 134, a conversion program 135, a sending program 136, and a cache execution program 137. In the example illustrated in FIG. 35, the CPU 140 reads each of the programs 131 to 133 from the ROM 130 and executes it so that each of the programs 131 to 133 function as a distinguishing process 141, an acquisition process 142, and a notification process 143, respectively. Furthermore, the CPU reads each of the programs 134 to 137 from the ROM and executes them so that each of the programs 134 to 137 functions as a determining process 144, a conversion process 145, a sending process 146, and a cache execution process 147, respectively. Each of the processes 141 to 147 has the same function as that performed by the units 3 to 7 illustrated in FIG. 1. Each of the processes 141 to 147 can also have the same function as that performed by each unit according to the second or the third embodiment.

The conversion program described in the embodiments can be implemented by a program prepared in advance and executed by a computer, such as a personal computer or a workstation. The program can be sent using a network such as the Internet. Furthermore, the program can be stored in a computer-readable recording medium, such as a hard disc drive, a flexible disk (FD), a compact disc read only memory (CD-ROM), a magneto optical disc (MO), and a digital versatile disc (DVD). Furthermore, the program can also be implemented by the computer reading it from the recording medium.

The content conversion program disclosed in the present invention can appropriately and advantageously use the cache stored in each conversion server.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable, non-transitory medium storing a content conversion program causing a conversion server to execute a procedure, the procedure comprising:

analyzing, when a send request for content is received from a client terminal, the send request and distinguishing between client information and content information, wherein the client information indicates a type of the client terminal, the type indicating a usable format of content for the client terminal, and the content information indicates a content that is requested to be sent to the client terminal;

acquiring, from a storing unit, server information and cache information that are associated with a combination of the distinguished client information and the distinguished content information, wherein the storing unit stores therein a combination of the client information, the content information, server information and cache information, wherein the server information indicates a conversion server responsible for converting a format of the content to a usable format for the client terminal and the cache information indicates an identifier of a cache storing the content in the usable format for the client terminal; and notifying a conversion server indicated by the server information, when the conversion server is not the conversion server executing the procedure, of the distinguished client information, the distinguished content information, the cache information and connection information indicating a connection that is established with the client terminal, the connection information including IP addresses, port numbers, a sequence number, and a confirmation response number.

2. A computer-readable, non-transitory medium storing a content conversion program causing a computer to execute a procedure, the computer acting as a conversion server responsible for converting a format of a content to a format usable for a client terminal wherein the content is requested to be sent to the client terminal, in accordance with client information indicating a type of the client terminal, the type indicating a usable format of content for the client terminal, the procedure comprising:

determining, when the conversion server is notified by another conversion server of the client information, content information that indicates the content and cache information that indicates an identifier of a cache storing the content in the usable format for the client terminal and connection information including IP addresses, port numbers, a sequence number, and a confirmation response number, whether a converted content, the content in the usable format for the client terminal, is stored in a cache in the conversion server, by the cache information; and sending, when it is determined that the converted content is stored in the cache in the conversion server, the converted content to the client terminal acquiring, when it is determined that the converted content is not stored in the cache in the conversion server, the content indicated by the content information from a content server that stores therein the content indicated by the content information notified by the another conversion server;

converting a format of the acquired content to a usable format for the client terminal whose type is indicated by the client information notified by the another conversion server; and sending the converted content to the client terminal and storing the converted content in the cache in the conversion server.

3. The computer-readable, non-transitory medium according to claim 2, wherein the procedure further comprises:

establishing, when it is determined that the converted content is not stored in the cache in the conversion server, a connection with the content server;

notifying the another conversion server of connection information indicating the established connection; and acquiring, by a computer that acts as the another conversion server, when the content indicated by the content information is requested from the content server using the notified connection information, the content requested by the another conversion server using the connection established with the content server.

4. A content conversion system comprising:
a first conversion server including,
 a storing unit that stores therein, in an associated manner, a combination of client information indicating a type of a client terminal, the type indicating a usable format of content for the client terminal, content information indicating content that is data requested to be sent to the client terminal, server information indicating a conversion server responsible for converting a format of the content to a usable format for the client terminal, and cache information indicating an identifier of a cache storing the content in the usable format for the client terminal,
 a distinguishing unit that analyzes, when a send request for content is received from a client terminal, the send request and that distinguishes between the client information and the content information,
 an acquiring unit that acquires, from the storing unit, the server information and the cache information that are associated with the combination of the client information and the content information that are distinguished by the distinguishing unit, and
 a notifying unit that notifies a conversion server that is indicated by the server information acquired by the acquiring unit, when the conversion server is not the first conversion server, of the distinguished client information, the distinguished content information, the cache information and connection information indicating a connection that is established with the client terminal, the connection information including IP addresses, port numbers, a sequence number, and a confirmation response number; and a second conversion server including,
 a determining unit that determines, when the second conversion server is notified by the first conversion server of the client information, the content information and the cache information, whether a converted content, the content in the usable format for the client terminal, is stored in a cache in the second conversion server, by the cache information, and
 a sending unit that sends, when it is determined, by the determining unit, that the converted content is stored in the cache in the second conversion server, to the client terminal, the converted content.

5. A content conversion server comprising:
a storing unit that stores therein, in an associated manner, a combination of client information indicating a type of a client terminal, the type indicating a usable format of content for the client terminal, content information indicating content that is data requested to be sent to the client terminal, server information indicating a conversion server responsible for converting a format of the content to a usable format for the client terminal, and cache information indicating an identifier of a cache storing the content in the usable format for the client terminal;

a distinguishing unit that analyzes, when a send request for content is received from a client terminal, the send request and that distinguishes between the client information and the content information;

an acquiring unit that acquires, from the storing unit, the server information and the cache information that are associated with the combination of the client information and the content information that are distinguished by the distinguishing unit; and a notifying unit that notifies a conversion server that is indicated by the server information acquired by the acquiring unit, when the indicated conversion server is not the content conversion server, of the distinguished client information, the distinguished content information, the cache information and connection information indicating a connection that is established with the client terminal, the connection information including IP addresses, port numbers, a sequence number, and a confirmation response number.

6. A content conversion method comprising:
analyzing, when a send request for content is received from a client terminal, the send request and distinguishing between client information and content information, wherein the client information indicates a type of the client terminal, the type indicating a usable format of content for the client terminal, and the content information indicates a content that is requested to be sent to the client terminal;

acquiring, from a storing unit, server information and cache information that are associated with a combination of the distinguished client information and the distinguished content information, wherein the storing unit stores therein a combination of the client information, the content information, server information and cache information, wherein the server information indicates a conversion server responsible for converting a format of the content to a usable format for the client terminal and the cache information indicates an identifier of a cache storing the content in the usable format for the client terminal; and notifying the conversion server indicated by the server information, when the indicated conversion server is not the conversion server, of the distinguished client information and the distinguished content information, the cache information and connection information indicating a connection that is established with the client terminal, the connection information including IP addresses, port numbers, a sequence number, and a confirmation response number.

7. A content conversion method performed in a conversion server responsible for converting a format of a content to a format usable for a client terminal wherein the content is requested to be sent to the client terminal, in accordance with client information indicating a type of the client terminal, the type indicating a usable format of content for the client terminal, the content conversion method comprising:

determining, when the conversion server is notified by another conversion server of the client information, content information that indicates the content and cache information that indicates an identifier of a cache storing the content in the usable format for the client terminal and connection information including IP addresses, port numbers, a sequence number, and a confirmation response number, whether a converted content, the content in the usable format for the client terminal, is stored in a cache in the conversion server, by the cache information; and sending, when it is determined that the converted content is stored in the cache in the conversion server, the converted content to the client terminal acquiring, when it is determined that the converted content is not stored in the cache in the conversion server, the content indicated by the content information from a content server that stores therein the content indicated by the content information notified by the another conversion server;

converting a format of the acquired content to a usable format for the client terminal whose type is indicated by the client information notified by the another conversion server; and sending the converted content to the client terminal and storing the converted content in the cache in the conversion server.

* * * * *